US011987048B2

(12) United States Patent
Orihara et al.

(10) Patent No.: US 11,987,048 B2
(45) Date of Patent: May 21, 2024

(54) DRIVING DEVICE AND METHOD FOR CONTROLLING DRIVING DEVICE

(71) Applicant: SEIKO EPSON CORPORATION, Tokyo (JP)

(72) Inventors: Daichi Orihara, Nagano (JP); Masashi Kamiyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 213 days.

(21) Appl. No.: 17/645,067

(22) Filed: Dec. 20, 2021

(65) Prior Publication Data

US 2022/0194077 A1 Jun. 23, 2022

(30) Foreign Application Priority Data

Dec. 22, 2020 (JP) ................................ 2020-212702

(51) Int. Cl.
*B41J 2/45* (2006.01)
*B41J 2/045* (2006.01)
*B41J 2/14* (2006.01)

(52) U.S. Cl.
CPC ......... *B41J 2/0455* (2013.01); *B41J 2/04541* (2013.01); *B41J 2/04581* (2013.01); *B41J 2/14233* (2013.01)

(58) Field of Classification Search
None
See application file for complete search history.

(56) References Cited

U.S. PATENT DOCUMENTS

2015/0054876 A1* 2/2015 Nakazawa ........... B41J 2/04541 347/14

FOREIGN PATENT DOCUMENTS

JP 2017-114049 A 6/2017

* cited by examiner

*Primary Examiner* — Erica S Lin
(74) *Attorney, Agent, or Firm* — Global IP Counselors, LLP

(57) ABSTRACT

A driving device includes a piezoelectric element, a driving electrode, a first switch that performs switching whether to electrically couple the first wire to the driving electrode, a detection circuit that detects, via a second wire, a vibration produced in the piezoelectric element, a second switch that performs switching whether to electrically couple the second wire to the driving electrode, and a determination circuit that determines a state of the piezoelectric element. The second switch remains off during a first period, remains on during a second period subsequent to the first period, remains off during a third period subsequent to the second period, and remains on during a fourth period subsequent to the third period. The determination circuit determines a state of the piezoelectric element, based on a detection result of the detection circuit in at least part of the fourth period.

7 Claims, 19 Drawing Sheets

| Sd[m] | D[m] | Qc[m] | | Qs[m] | | Qf | |
|---|---|---|---|---|---|---|---|
| | | TQ1 | TQ2 | TQ1 | TQ2 | TQ1 | TQ2 |
| 1 | DP-1 | H | H | L | L | L | L |
| 2 | DP-2 | H | L | L | L | L | L |
| 3 | DP-3 | L | H | L | L | L | L |
| 4 | DP-4 | L | L | L | L | L | L |

| Sd[m] | D[m] | Qc[m] | | | | |
|---|---|---|---|---|---|---|
| | | TT1 | TT2 | TT3 | TT4 | TT5 |
| 5 | DJ | H | H | L | L | L |
| 6 | DH | H | H | L | L | H |

FIG. 11

| Sd[m] | D[m] | Qs[m] | | | | |
|---|---|---|---|---|---|---|
| | | TT1 | TT2 | TT3 | TT4 | TT5 |
| 5 | DJ | L | H | H | H | L |
| 6 | DH | L | H | H | H | L |

FIG. 12

| | TT1 | TT2 | TT3 | TT4 | TT5 |
|---|---|---|---|---|---|
| Qf | L | H | H | H | L |
| Q1 | H | H | L | H | H |
| Q2 | L | L | H | L | L |

FIG. 21

| VM | NTC | JH |
|---|---|---|
| Vth ≤ VM[m] | NTC[m] < Tth-L | 2 : DISCHARGE ABNORMALITY (BUBBLE) |
| | Tth-L ≤ NTC[m] ≤ Tth-H | 1 : NORMAL |
| | Tth-H < NTC[m] | 3 : DISCHARGE ABNORMALITY (FOREIGN SUBSTANCE, INCREASED VISCOSITY) |
| VM[m] < Vth | NTC[m] < Tth-L | 4 : FAILURE |
| | Tth-L ≤ NTC[m] ≤ Tth-H | 4 : FAILURE |
| | Tth-H < NTC[m] | 4 : FAILURE |

DRIVING DEVICE AND METHOD FOR CONTROLLING DRIVING DEVICE

The present application is based on, and claims priority from JP Application Serial Number 2020-212702, filed Dec. 22, 2020, the disclosure of which is hereby incorporated by reference herein in its entirety.

BACKGROUND

1. Technical Field

The present disclosure relates to a driving device and a method for controlling a driving device.

2. Related Art

Driving devices including piezoelectric elements each of which includes a driving electrode and is driven by a driving signal supplied to the driving electrode, such as ink jet printers, have become widely used. For such driving devices, a technology of detecting vibrations produced in a piezoelectric element driven by the driving signal and determining a state of the piezoelectric element based on a result of the detection has been proposed (for example, JP-A-2017-114049).

However, with the related-art technology, in a switch that performs switching whether to electrically couple a driving electrode included in a piezoelectric element to a detection circuit that detects a vibration produced in the piezoelectric element, noise caused by opening and closing the switch may occur. Therefore, with the related-art technology, the detection circuit may not accurately detect vibrations produced in the piezoelectric element.

SUMMARY

A driving device according to the present disclosure includes a piezoelectric element that includes a driving electrode and is driven by a driving signal supplied through a first wire to the driving electrode, a first switch that performs switching whether to electrically couple the first wire to the driving electrode, a detection circuit that detects, via a second wire, a vibration produced in the piezoelectric element driven by the driving signal, as a potential change in the driving electrode, a second switch that performs switching whether to electrically couple the second wire to the driving electrode, and a determination circuit that determines a state of the piezoelectric element. The second switch remains off during a first period, remains on during a second period subsequent to the first period, remains off during a third period subsequent to the second period, and remains on during a fourth period subsequent to the third period. The determination circuit determines a state of the piezoelectric element, based on a detection result of the detection circuit in at least part of the fourth period.

A method for controlling a driving device according to the present disclosure is a method for controlling a driving device including a piezoelectric element that includes a driving electrode and is driven by a driving signal supplied through a first wire to the driving electrode, a first switch that performs switching whether to electrically couple the first wire to the driving electrode, a detection circuit that detects, via a second wire, a vibration produced in the piezoelectric element driven by the driving signal, as a potential change in the driving electrode, and a second switch that performs switching whether to electrically couple the second wire to the driving electrode. The method includes controlling the second switch to cause the second switch to remain off during a first period, to remain on during a second period subsequent to the first period, to remain off during a third period subsequent to the second period, and to remain on during a fourth period subsequent to the third period, and determining a state of the piezoelectric element, based on a detection result of the detection circuit in at least part of the fourth period.

BRIEF DESCRIPTION OF THE DRAWINGS

FIG. 11 is a table illustrating an example of the individual specification signals.

FIG. 12 is a table illustrating an example of coupling-state specification signals.

FIG. 21 is an illustrative diagram illustrating an example of operations of a determination unit.

DESCRIPTION OF EXEMPLARY EMBODIMENTS

Embodiments for carrying out the present disclosure will be described below with reference to the accompanying drawings. In each of the drawings, the dimensions and scales of elements are appropriately different from those of actual elements. The embodiments described below are specific examples of the present disclosure and therefore various technical limitations are given thereto. However, the scope of the present disclosure is not limited to these forms unless the description given below particularly limits the present disclosure.

A. EMBODIMENT

In the present embodiment, a driving device is described by illustrating an ink jet printer that discharges ink to form an image on recording paper P. In the present embodiment, the ink is an example of "liquid" and the recoding paper P is an example of a "medium".

1. Outline of Ink Jet Printer

With reference to FIGS. 1 to 4, an example of a configuration of an ink jet printer 1 according to the present embodiment will be described below.

Figure 1:
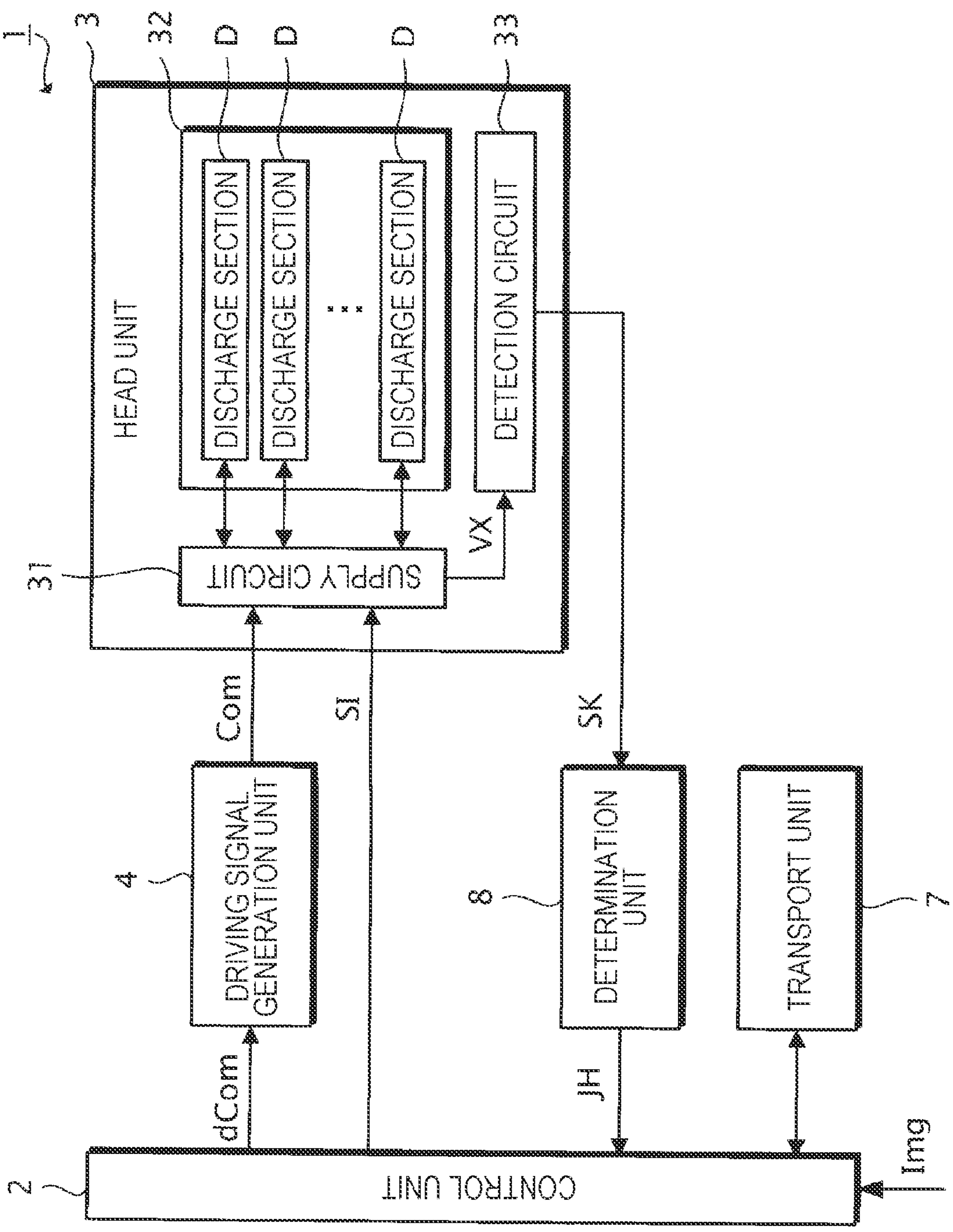
FIG. 1 is a block diagram illustrating an example of a configuration of an ink jet printer according to an embodiment of the present disclosure.

FIG. 1 is a functional block diagram illustrating an example of a configuration of the ink jet printer 1. Print data Img representing an image to be formed by the ink jet printer 1 is supplied from a host computer, such as a personal computer or a digital camera, to the ink jet printer 1. The ink jet printer 1 performs a printing process for forming, on the recording paper P, an image represented by the print data Img supplied from the host computer.

As illustrated in FIG. 1, the ink jet printer 1 includes a control unit 2 that controls each section of the ink jet printer 1, a head unit 3 provided with discharge units D that discharge ink, a driving signal generation unit 4 that generates a driving signal Com for driving the discharge section D, a transport unit 7 for changing a relative position of the recording paper P with respect to the head unit 3, and a determination unit 8 that determines an ink discharge state in the discharge section D.

In the present embodiment, it is assumed that the ink jet printer 1 includes one or more head units 3, one or more driving signal generation units 4 corresponding one to one to the one or more head units 3, and one or more determination units 8 corresponding one to one to the one or more head units 3. However, for convenience of description, as illustrated in FIG. 1, the description given below is focused on one head unit 3 of the one or more head units 3, one driving signal generation unit 4 provided for the one head unit 3, and one determination unit 8 provided for the one head unit 3.

The control unit 2 includes one or more CPUs. The control unit 2 may include a programmable logic device, such as an FPGA, instead of or in addition to the CPU. The term CPU is an abbreviated name of a central processing unit and the term FPGA is an abbreviated name of a field-programmable gate array.

As will be described in more detail below, the control unit 2 generates signals for controlling operations of sections of the ink jet printer 1, such as a print signal SI and a waveform specification signal dCom.

The waveform specification signal dCom is a digital signal defining the waveform of the driving signal Com. The driving signal Com is an analog signal for driving the discharge section D. The driving signal generation unit 4, which includes a digital-to-analog (DA) conversion circuit, generates the driving signal Com having a waveform defined by the waveform specification signal dCom. The print signal SI is a digital signal for specifying the type of operations of the discharge section D. Specifically, the print signal SI is a signal that specifies the type of operations of the discharge section D by specifying whether to supply the driving signal Com to the discharge section D.

As illustrated in FIG. 1, the head unit 3 includes a supply circuit 31, a recording head 32, and a detection circuit 33.

The recording head 32 includes M discharge sections D. The value M is a natural number that satisfies M 1. Of the M discharge sections D provided in the recording head 32, an mth discharge section D may be referred to below as a discharge section D[m]. The variable m is a natural number that satisfies 1≤m≤M. When, for example, a component or a signal of the ink jet printer 1 corresponds to the discharge section D[m] of the M discharge sections, an index [m] may be appended hereinbelow to a reference character designating the component or the signal.

In accordance with the print signal SI, the supply circuit 31 performs switching whether to supply the driving signal Com to the discharge section D[m]. Of the driving signals Com, the driving signal Com that is supplied to the discharge section D[m] may be referred to below as a supply driving signal Vin[m]. In accordance with the print signal SI, the supply circuit 31 performs switching whether to supply a detection potential signal VX[m], which indicates the potential of an upper electrode Zu[m] of the piezoelectric element PZ[m] included in discharge section D[m], to the detection circuit 33. The piezoelectric element PZ[m] and the upper electrode Zu[m] are described later with reference to FIG. 3.

The detection circuit 33 generates a detection signal SK[m] based on the detection potential signal VX[m] supplied through the supply circuit 31 from the discharge section D[m]. Specifically, the detection circuit 33 generates the detection signal SK[m], for example, by amplifying the detection potential signal VX[m] and removing the noise component.

The determination unit 8 includes a circuit that determines based on the detection signal SK[m] whether the discharge state of ink in the discharge section D[m] is normal, that is, whether the discharge state is a normal state in which no discharge abnormality has occurred in the discharge section D[m], and generates discharge state determination information JH[m] indicating a result of this determination. The discharge abnormality is a collective term for abnormalities in the discharge of ink in the discharge section D[m], that is, states in which it is impractical to accurately discharge ink from nozzles N included in the discharge section D[m]. For example, discharge abnormalities include a state in which it is impractical to discharge ink from the discharge section D[m], a state in which the discharge section D[m] discharges ink of an amount different from the discharge amount defined by the driving signal Com, a state in which the discharge section D[m] discharges ink at a velocity different from the discharge velocity defined by the driving signal Com, and other states. The circuit included in the determination unit 8 is an example of the "determination circuit".

A process regarding determination of a discharge state of ink made by the determination unit 8 is referred to hereinafter as a discharge-state determination process.

In the present embodiment, the ink jet printer 1 performs a discharge-state determination preparation process, which is a process for enhancing the determination accuracy in the discharge-state determination process, prior to performing the discharge-state determination process. As will be described in more detail below, the discharge-state determination preparation process is a process of driving the discharge section D[m] with the driving signal Com and supplying the detection potential signal VX[m], which indicates the potential of the upper electrode Zu[m] included in the discharge section D[m], to the detection circuit 33.

The discharge section D[m] for which the discharge-state determination process is to be performed may be referred to below as a determination target discharge section DH. The discharge section D[m] for which the discharge-state determination preparation process is to be performed may be referred to below as a determination preparation discharge section DJ. The determination target discharge section DH and the determination preparation discharge section DJ may each be referred to below as a detection target discharge section DK. The discharge section D[m] that does not correspond to the detection target discharge section DK may be referred to below as a non-detection target discharge section DP.

When the printing process is performed, the control unit 2 generates signals for controlling the head unit 3, such as the print signal SI, based on the print data Img. When the printing process is performed, the control unit 2 generates signals for controlling the driving signal generation unit 4, such as the waveform specification signal dCom. When the printing process is performed, the control unit 2 generates signals for controlling the transport unit 7. Thereby, in the printing process, the control unit 2 controls sections of the ink jet printer 1 by adjusting, for example, whether to allow ink to be discharged from the discharge section D[m], the discharge amount of ink, and the timing at which ink is discharged, while controlling the transport unit 7 so as to change the relative position of the recording paper P with respect to the head unit 3, so that an image corresponding to the print data Img is formed on the recording paper P.

When the discharge-state determination process is performed, the control unit 2 generates the print signal SI specifying that the discharge section D[m] is to be driven as the determination target discharge section DH. The control unit 2 supplies this print signal SI to the supply circuit 31. In this case, the print signal SI specifies that the detection potential signal VX[m] is to be supplied from the discharge section D[m] to the detection circuit 33. Then, in the discharge-state determination process, the detection circuit 33 generates the detection signal SK[m] based on the detection potential signal VX[m] supplied through the supply circuit 31 from the discharge section D[m] driven as the determination target discharge section DH. The determination unit 8 generates the discharge state determination information JH[m] based on the detection signal SK[m] supplied from the detection circuit 33.

When the discharge-state determination preparation process is performed, the control unit 2 generates the print signal SI specifying that the discharge section D[m] is to be driven as the determination preparation discharge section DJ. The control unit 2 supplies this print signal SI to the supply circuit 31. In this case, the print signal SI specifies that the detection potential signal VX[m] is to be supplied from the discharge section D[m] to the detection circuit 33. In the discharge-state determination preparation process, the determination unit 8 does not generate the discharge state determination information JH[m].

Figure 2:
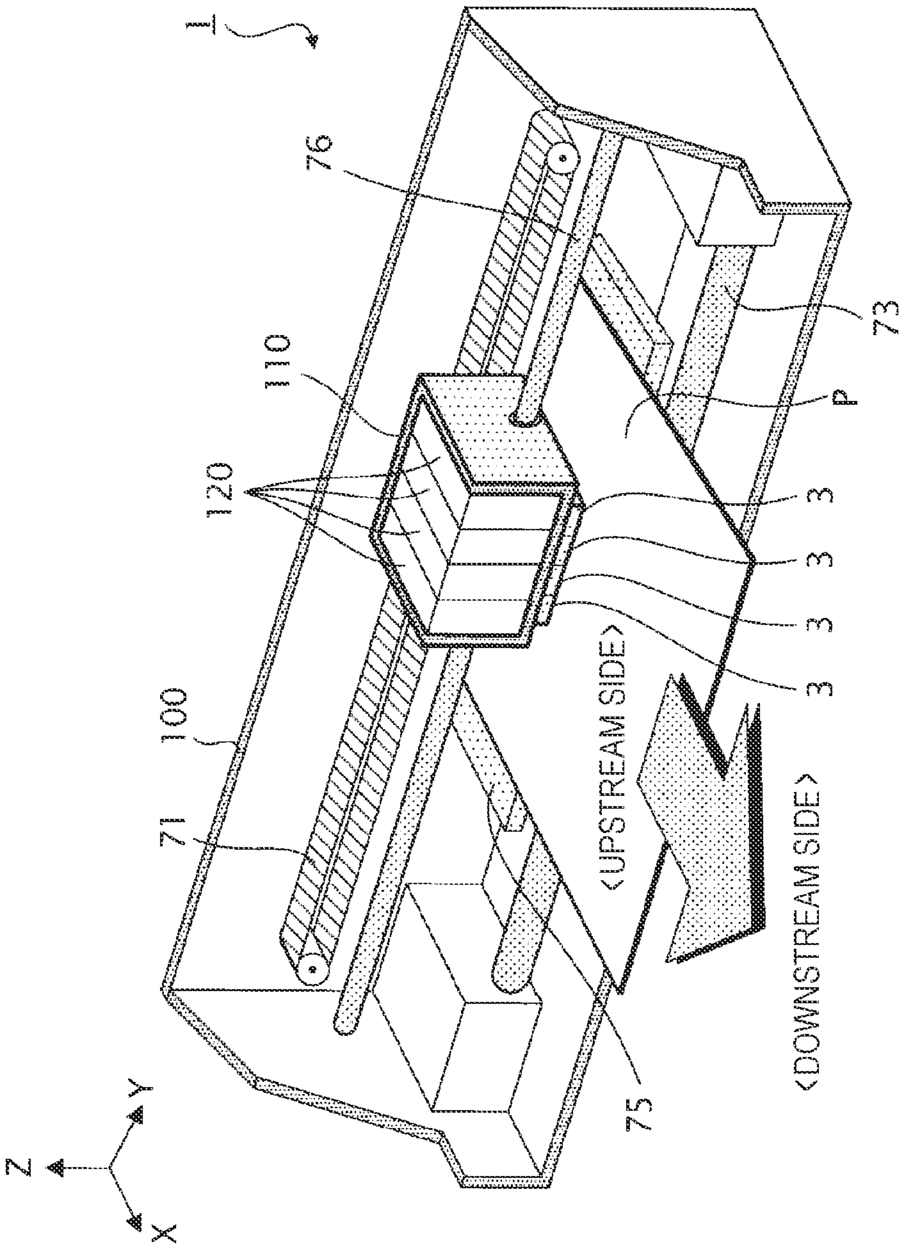
FIG. 2 is a perspective view illustrating an example of a schematic internal configuration of the ink jet printer.

FIG. 2 is a perspective view illustrating an example of a schematic internal configuration of the ink jet printer 1.

As illustrated in FIG. 2, in the present embodiment, it is assumed that the ink jet printer 1 is a serial printer. Specifically, when performing the printing process, the ink jet printer 1 discharges ink from the discharge section D[m] while reciprocating the head unit 3 in a main scanning direction intersecting a sub scanning direction and simultaneously transporting the recording paper P in the sub scanning direction, thereby forming dots in accordance with the print data Img on the recording paper P.

A+X direction and a −X direction that is a direction opposite to the +X direction are each referred to collectively as an "X-axis direction", a +Y direction intersecting the X-axis direction and a −Y direction that is a direction opposite to the +Y direction are each referred to collectively as a "Y-axis direction", and a +Z direction intersecting the X-axis direction and the Y-axis direction and a −Z direction that is a direction opposite to the +Z direction are each referred to collectively as a "Z-axis direction". In the present embodiment, as illustrated in FIG. 2, a direction from a −X side, which is upstream in the direction of transportation, to a +X side, which is downstream in the direction of transportation, is assumed as the sub-scanning direction, and the +Y direction and the −Y direction are each assumed as the main scanning direction.

As illustrated in FIG. 2, the ink jet printer 1 according to the present embodiment includes a housing 100 and a carriage 110 capable of being reciprocated in the Y-axis direction within the housing 100. On the carriage 110, one or more head units 3 are mounted.

In the present embodiment, as illustrated in FIG. 2, it is assumed that four ink cartridges 120 corresponding one to one to four colors, cyan, magenta, yellow, and black, are stored in the carriage 110. In the present embodiment, it is also assumed by way of example that the ink jet printer 1 includes four head units 3 corresponding one to one to the four ink cartridges 120. Each discharge section D[m] receives supply of ink from the ink cartridge 120 corresponding to the head unit 3 in which this discharge section D[m] is provided. This enables each discharge section D[m] to be filled inside with the supplied ink and to discharge the ink, with which the discharge section is filled inside, from the nozzle N. The ink cartridge 120 may be provided outside the carriage 110. The nozzle N is described later with reference to FIG. 3.

As described above, the ink jet printer 1 according to the present embodiment includes the transport unit 7. As illustrated in FIG. 2, the transport unit 7 includes a carriage transport mechanism 71 for reciprocating the carriage 110 in the Y-axis direction, a carriage guide shaft 76 supporting the carriage 110 reciprocatingly in the Y-axis direction, a medium transport mechanism 73 for transporting the recording paper P, and a platen 75 provided on the −Z side of the carriage 110. Therefore, when the printing process is performed, the transport unit 7 reciprocates the head unit 3 together with the carriage 110 along the carriage guide shaft 76 in the Y-axis direction by using the carriage transport mechanism 71 and transports the recording paper P on the platen 75 in the +X direction by using the medium transport mechanism 73 so as to change the relative position of the recording paper P with respect to the head unit 3, which enables ink to be landed on the entire recording paper P.

Figure 3:
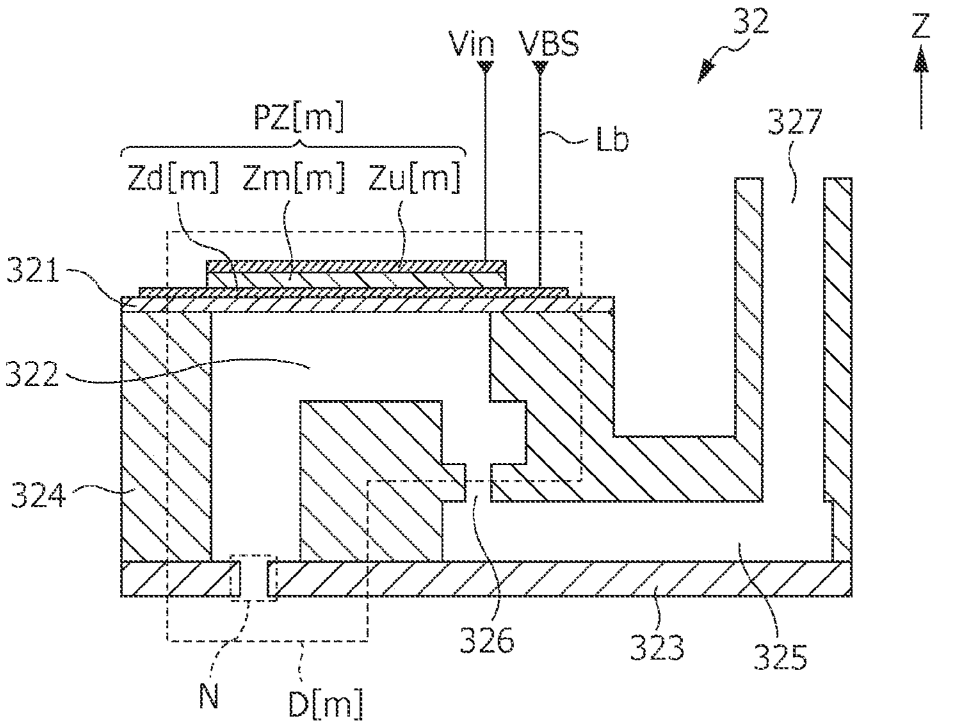
FIG. 3 is a sectional view illustrating an example of a configuration of a discharge section.

FIG. 3 is a schematic partial sectional view of the recording head 32 in which the recording head 32 is cut to include the discharge section D[m].

As illustrated in FIG. 3, the discharge section D[m] includes the piezoelectric element PZ[m], a cavity 322 filled inside with ink, the nozzle N communicating with the cavity 322, and a vibrating plate 321. The discharge section D[m] discharges ink in the cavity 322 from the nozzle N by the piezoelectric element PZ[m] being driven by the supply driving signal Vin[m]. The cavity 322 is a space partitioned by a cavity plate 324, a nozzle plate 323 in which the nozzle N is formed, and a vibrating plate 321. The cavity 322 communicates with a reservoir 325 via an ink supply port 326. The reservoir 325 communicates with the ink cartridge 120 corresponding to the discharge section D[m] via an ink intake port 327. The piezoelectric element PZ[m] includes the upper electrode Zu[m], a lower electrode Zd[m], and a piezoelectric substance Zm[m] provided between the upper electrode Zu[m] and the lower electrode Zd[m]. The upper electrode Zu[m] is an example of the "driving electrode". The lower electrode Zd[m] is electrically coupled to an electrical supply line Lb set at a potential VBS. When the supply driving signal Vin[m] is supplied to the upper electrode Zu[m] and thus a voltage is applied between the upper electrode Zu[m] and the lower electrode Zd[m], the piezoelectric element PZ[m] is displaced in the +Z direction or the −Z direction in accordance with the applied voltage and, as a result, the piezoelectric element PZ[m] vibrates. The lower electrode Zd[m] is bonded to the vibrating plate 321. Therefore, when the piezoelectric element PZ[m] vibrates by being driven by the supply driving signal Vin[m], the vibrating plate 321 also vibrates. The vibration of the vibrating plate 321 changes the volume of the cavity 322 and the pressure inside the cavity 322, so that the ink with which the cavity 322 is filled inside is discharged from the nozzle N.

Figure 4:
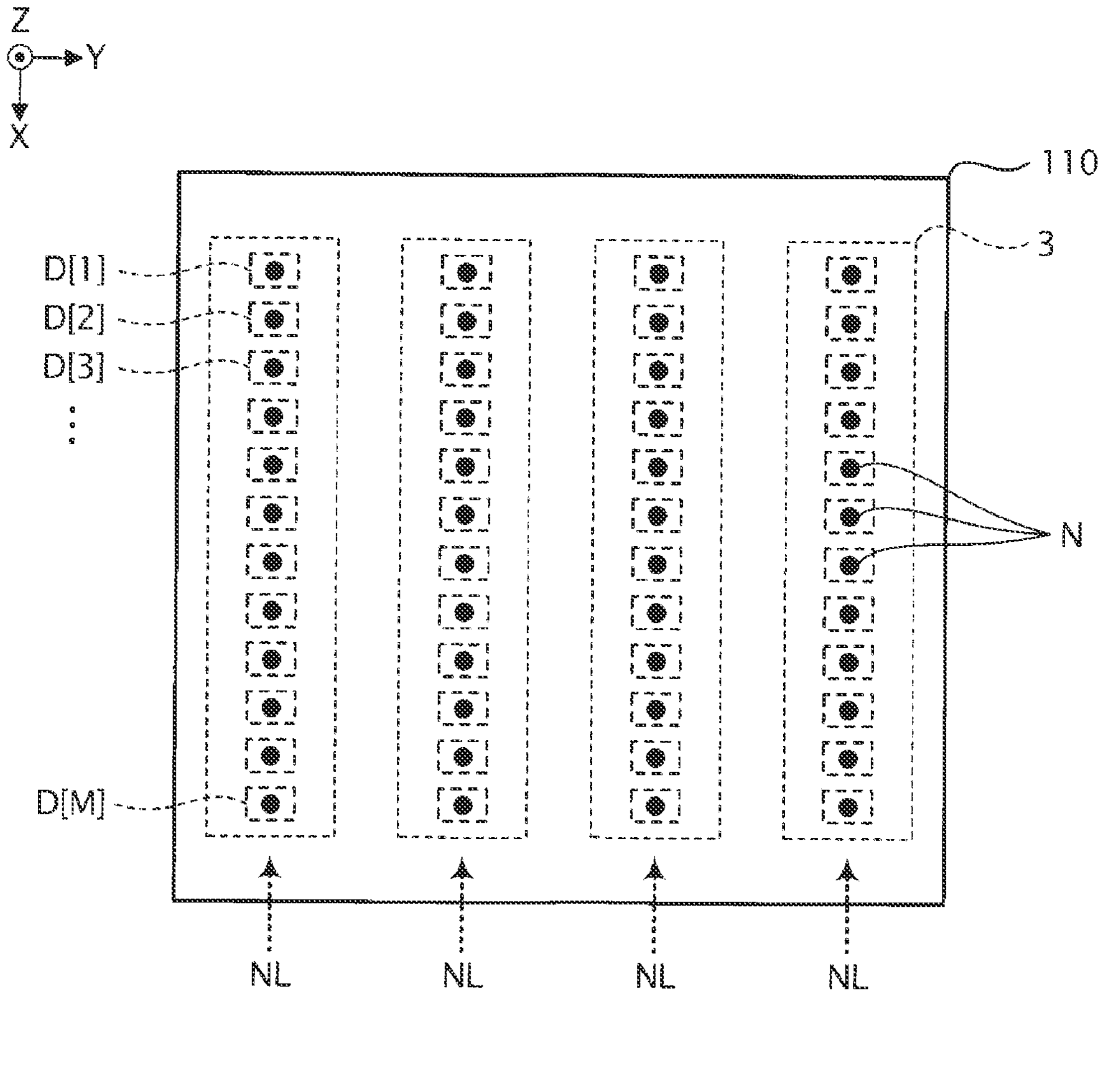
FIG. 4 is a plan view illustrating an example of arrangement of nozzles in a head unit.

FIG. 4 is an illustrative diagram illustrating an example of arrangement of four head units 3 mounted on the carriage 110 and a total of 4M nozzles N provided in the four head units 3 when the ink jet printer 1 is viewed in plan view from the −Z side.

As illustrated in FIG. 4, each head unit 3 provided on the carriage 110 is provided with a nozzle line NL. The nozzle line NL is a plurality of nozzles N provided to extend in a line in a predetermined direction. In the present embodiment, it is assumed by way of example that each nozzle line NL consists of M nozzles N arranged to extend in the X-axis direction.

2. Configuration of Head Unit

Figure 5:
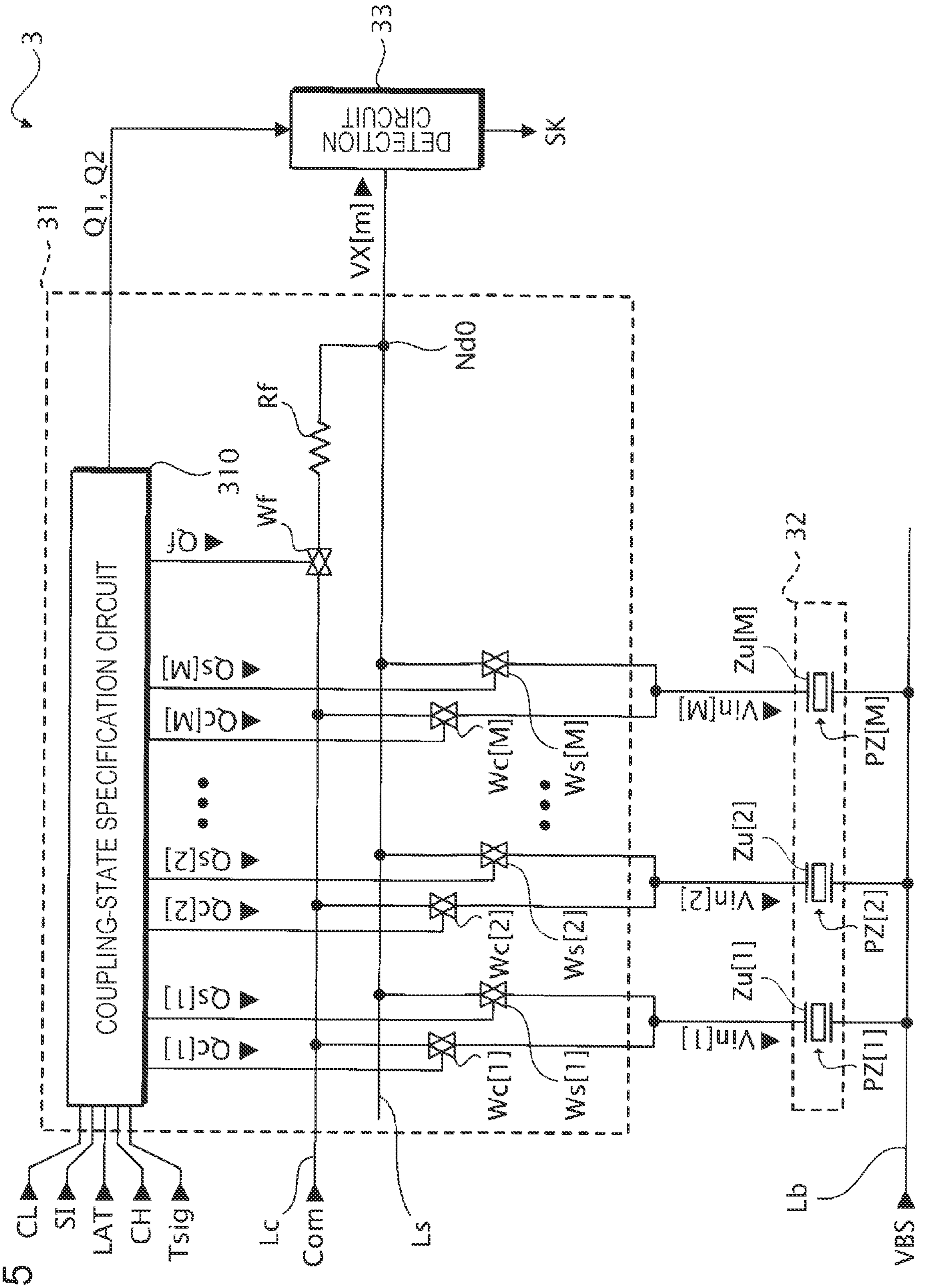
FIG. 5 is a block diagram illustrating an example of a configuration of the head unit.
Figure 6:
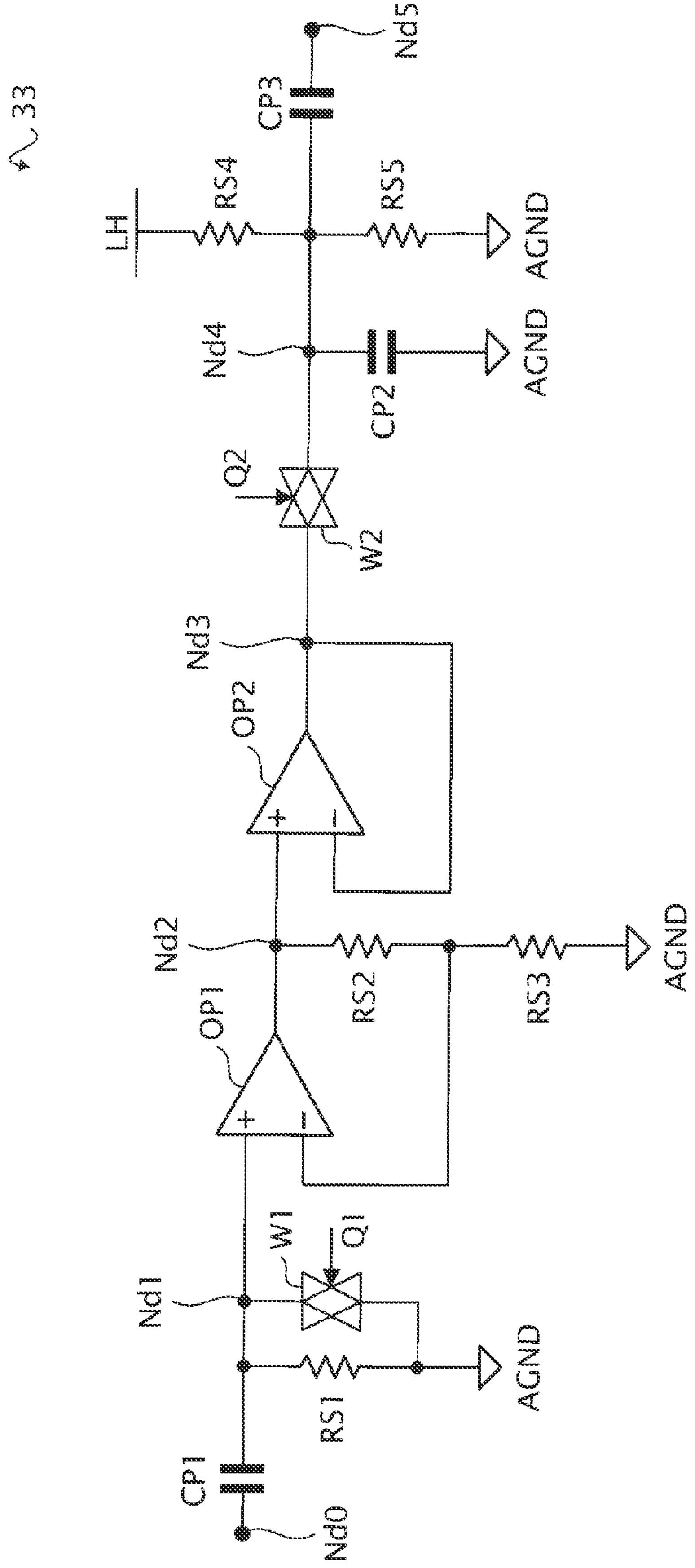
FIG. 6 is a block diagram illustrating an example of a configuration of a detection circuit.

With reference to FIGS. 5 and 6, a configuration of the head unit 3 will be described below.

FIG. 5 is a block diagram illustrating an example of a configuration of the head unit 3. As described above, the head unit 3 includes the supply circuit 31, the recording head 32, and the detection circuit 33. FIG. 5 illustrates by way of example the case where the recording head 32 is provided with four discharge sections D, that is, the case where M=4.

As illustrated in FIG. 5, the head unit 3 includes a wire Lc through which the driving signal Com is supplied from the driving signal generation unit 4 and a wire Ls for supplying the detection potential signal VX[m] to the detection circuit 33. The wire Lc is an example of the "first wire" and the wire Ls is an example of the "second wire".

As illustrated in FIG. 5, the supply circuit 31 includes M switches Wc[1] to Wc[M] corresponding one to one to the M discharge sections D[1] to D[M], M switches Ws[1] to Ws[M] corresponding one to one to the M discharge sections D[1] to D[M], a switch Wf, a resistor Rf, and a coupling-state specification circuit 310 that specifies the coupling state of each switch.

The coupling-state specification circuit 310 generates a coupling-state specification signal Qc[m] specifying that the switch Wc[m] is to be on or off, a coupling-state specification signal Qs[m] specifying that the switch Ws[m] is to be on or off, a coupling-state specification signal Qf specifying that the switch Wf is to be on or off, a coupling-state specification signal Q1 described later, and a coupling-state specification signal Q2 described later based on at least some of the print signal SI, a latch signal LAT, a period specification signal Tsig, and a change signal CH supplied from the control unit 2.

In accordance with the coupling-state specification signal Qc[m], the switch Wc[m] performs switching between conducting and nonconducting states between the wire Lc and the upper electrode Zu[m] of the piezoelectric element PZ[m] provided in the discharge section D[m]. In the present embodiment, the switch Wc[m] is on when the coupling-state specification signal Qc[m] is high and is off when this signal is low. When the switch Wc[m] is on, the driving signal Com supplied to the wire Lc is supplied as the supply driving signal Vin[m] to the upper electrode Zu[m] of the discharge section D[m]. The switch Wc[m] is an example of the "first switch".

In accordance with the coupling-state specification signal Qs[m], the switch Ws[m] performs switching between conducting and nonconducting states between the wire Ls and the upper electrode Zu[m] of the piezoelectric element PZ[m] provided in the discharge section D[m]. In the present embodiment, the switch Ws[m] is on when the coupling-state specification signal Qs[m] is high and is off when this signal is low. When the switch Ws[m] is on, the potential of the upper electrode Zu[m] of the discharge section D[m] is supplied as the detection potential signal VX[m] through the wire Ls to the detection circuit 33. The switch Ws[m] is an example of the "second switch".

In accordance with the coupling-state specification signal Qf, the switch Wf performs switching between conducting and nonconducting states between the wire Lc and the wire Ls. In the present embodiment, the switch Wf is on when the coupling-state specification signal Qf is high and is off when this signal is low. When the switch Wf is on, the driving signal Com supplied to the wire Lc is supplied through the resistor Rf, which is electrically coupled between the switch Wf and the wire Ls, to a node Nd0, which is a portion of the wire Ls.

The switch Wf is an example of a "third switch" and the resistor Rf is an example of a "first resistor".

FIG. 6 is a block diagram illustrating an example of a configuration of the detection circuit 33.

As illustrated in FIG. 6, the detection circuit 33 includes capacitors CP1 to CP3, operational amplifiers OP1 and OP2, switches W1 and W2, and resistors RS1 to RS5.

One electrode of the capacitor CP1 is electrically coupled to the node Nd0, and the other electrode is electrically coupled to a node Nd1.

One end of the resistor RS1 is electrically coupled to the node Nd1, and the other end is electrically coupled to an analog ground AGND set at a fixed potential. Specifically, the potential of the analog ground AGND may be, for example, the center potential between a power supply potential on the high potential side and a power supply potential on the low potential side that are supplied to the head unit 3.

The switch W1 performs switching between conducting and nonconducting states between one end of the resistor RS1 and the analog ground AGND. In the present embodiment, the switch W1 is on when the coupling-state specification signal Q1 is high and is off when this signal is low.

In the present embodiment, the capacitor CP1, the resistor RS1, and the switch W1 function as a high-pass filter.

The operational amplifier OP1 includes a non-inverting input terminal electrically coupled to the node Nd1, an output terminal electrically coupled to the node Nd2, and an inverting input terminal electrically coupled through the resistor RS2 to the node Nd2 and electrically coupled through the resistor RS3 to the analog ground AGND. In the present embodiment, the operational amplifier OP1, the resistor RS2, and the resistor RS3 function as an amplifying circuit that amplifies the amplitude of a signal input to the node Nd1 and outputs the signal to the node Nd2.

The operational amplifier OP2 includes a non-inverting input terminal electrically coupled to the node Nd2, an inverting input terminal electrically coupled to the node Nd3, and an output terminal electrically coupled to the node Nd3. In the present embodiment, the operational amplifier OP2 functions as a buffer that converts the impedance and outputs a low impedance signal to the node Nd3.

The switch W2 performs switching between conducting and nonconducting states between the node Nd3 and the node Nd4. In the present embodiment, the switch W2 is on when the coupling-state specification signal Q2 is high and is off when the coupling-state specification signal Q2 is low.

One end of the capacitor CP2 is electrically coupled to the node Nd4, and the other end is electrically coupled to the analog ground AGND.

One end of the resistor RS4 is electrically coupled to the node Nd4, and the other end is electrically coupled to an electrical supply line LH set at a fixed potential. Specifically, the potential of the electrical supply line LH may be, for example, the power supply potential on the high potential side that is supplied to the head unit 3.

One end of the resistor RS5 is electrically coupled to the node Nd4, and the other end is electrically coupled to the analog ground AGND.

One electrode of the capacitor CP3 is electrically coupled to the node Nd4, and the other electrode is electrically coupled to the node Nd5. The node Nd5 is electrically coupled to the determination unit 8. In the present embodiment, a signal output from the node Nd5 corresponds to the detection signal SK[m].

As described above, the detection circuit 33 generates the detection signal SK[m] based on the detection potential signal VX[m] input to the node Nd0 and outputs the generated detection signal SK[m] from the node Nd5.

3. Operations of Head Unit

Figures 7, 8:
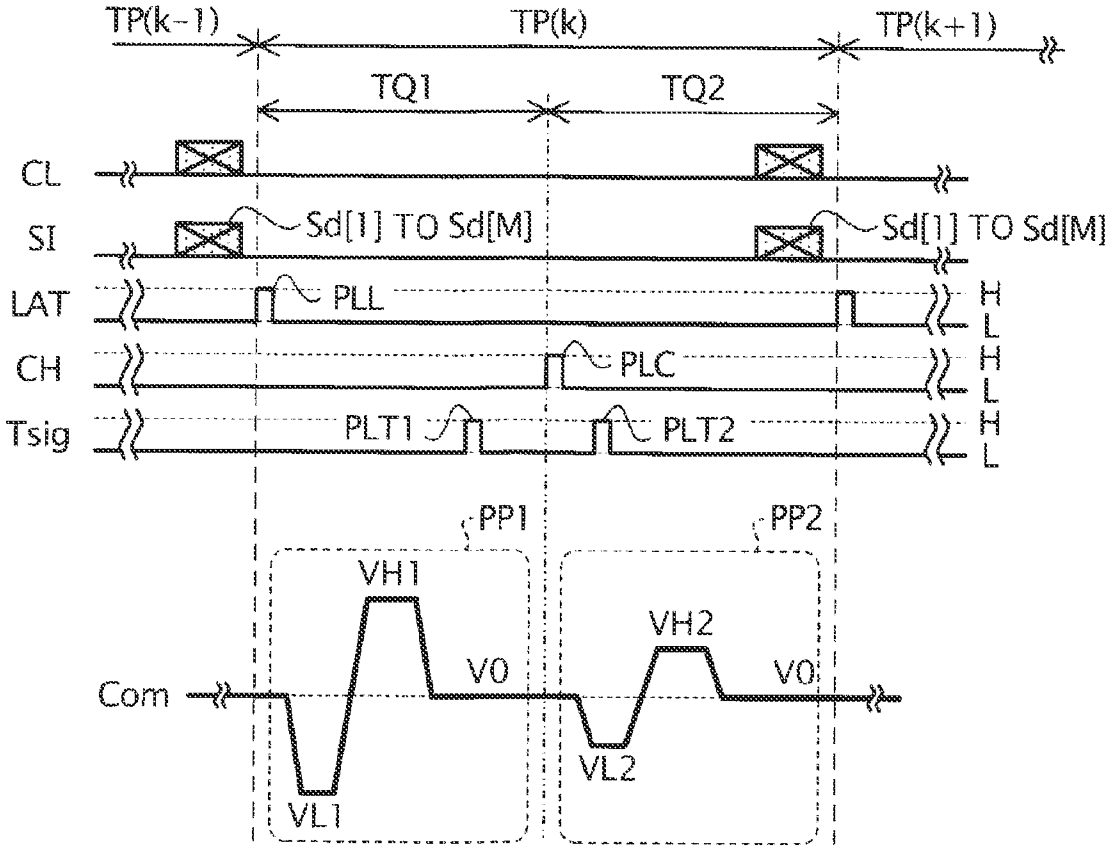
FIG. 7 is a timing chart illustrating an example of operations of the head unit.
FIG. 8 is a table illustrating an example of individual specification signals.
Figure 20:
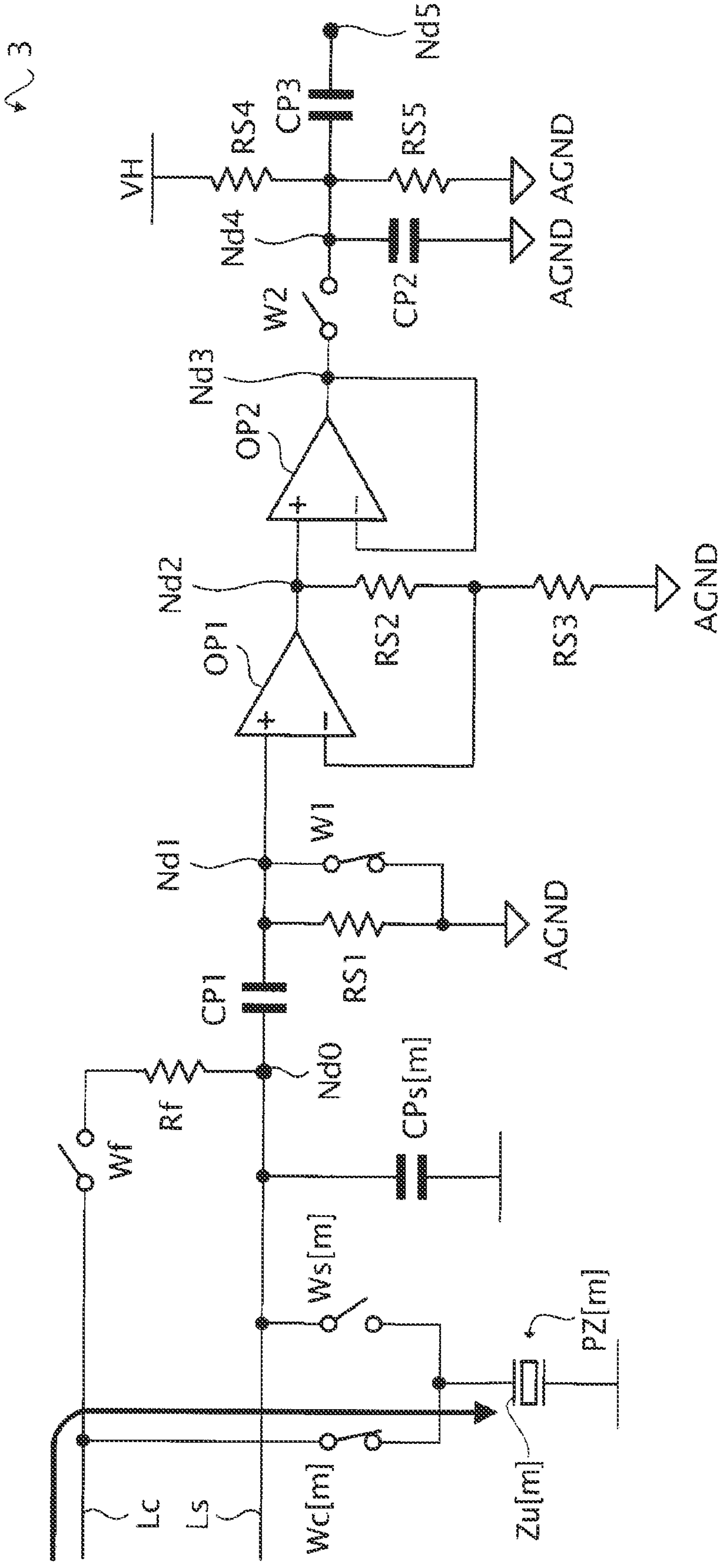
FIG. 20 is an illustrative diagram illustrating an example of operations of the head unit.

With reference to FIGS. 7 and 20, operations of the head unit 3 will be described below.

In the present embodiment, when the ink jet printer 1 performs the printing process, the discharge-state determination process, or the discharge-state determination preparation process, one or more unit periods TP are set as the operation period of the ink jet printer 1. In each unit period TP, the ink jet printer 1 according to the present embodiment may drive each discharge section D[m] for the printing process, the discharge-state determination process, or the discharge-state determination preparation process. A kth unit period TP of K successive unit periods TP may be expressed below as a unit period TP(k). The value K is a natural number that satisfies $K \geq 1$ and the variable k is a natural number that satisfies $1 \leq k \leq K$.

FIG. 7 is a timing chart illustrating an example of various signals that are supplied to the head unit 3 in a unit period TP if the printing process is performed during the unit period TP. The unit period TP during which the printing process is performed may be referred to below as a printing unit period TPP.

As illustrated in FIG. 7, the control unit 2 outputs the latch signal LAT having pulses PLL. Thus, the control unit 2 defines the unit period TP as a period from the rise of the pulse PLL to the rise of the next pulse PLL.

The control unit 2 also outputs the change signal CH having a pulse PLC in the unit period TP. The control unit 2 divides the unit period TP into a control period TQ1 from the rise of the pulse PLL to the rise of the pulse PLC and a control period TQ2 from the rise of the pulse PLC to the rise of the pulse PLL.

The control unit 2 also outputs the period specification signal Tsig in the unit period TP. The period specification signal Tsig will be described later.

The print signal SI according to the present embodiment includes M individual specification signals Sd[1] to Sd[M] corresponding one to one to the M discharge sections D[1] to D[M]. The individual specification signal Sd[m] specifies how the discharge section D[m] is driven in each unit period TP.

As illustrated in FIG. 7, prior to each unit period TP, the control unit 2 supplies the print signal SI including individual specification signals Sd[1] to Sd[M] in synchronization with a clock signal CL to the coupling-state specification circuit 310. In this unit period TP, the coupling-state specification circuit 310 generates the coupling-state specification signal Qc[m], the coupling-state specification signal Qs[m], and the coupling-state specification signal Qf based on the individual specification signal Sd[m].

In the present embodiment, it is assumed that, in the printing unit period TPP, the discharge section D[m] may form any one of a large dot, a medium dot smaller than the large dot, and a small dot smaller than the medium dot.

In the present embodiment, it is also assumed that, in the printing unit period TPP, the individual specification signal Sd[m] may take any one of four values, that is, a value of 1 that specifies the discharge section D[m] as a large-dot formation discharge section DP-1, which is the non-detection target discharge section DP that discharges an amount of ink equivalent to that of the large dot, a value of 2 that specifies the discharge section D[m] as a medium-dot formation discharge section DP-2, which is the non-detection target discharge section DP that discharges an amount of ink equivalent to that of the medium dot, a value of 3 that specifies the discharge section D[m] as a small-dot formation discharge section DP-3, which is the non-detection target discharge section DP that discharges an amount of ink equivalent to that of the small dot, and a value of 4 that specifies the discharge section D[m] as a non-dot formation discharge section DP-4, which is the non-detection target discharge section DP that discharges no ink.

As illustrated in FIG. 7, in the present embodiment, the driving signal Com has, in the printing unit period TPP, a waveform PP1 provided in the control period TQ1 and a waveform PP2 provided in the control period TQ2. Of the two waveforms, the waveform PP1 is a waveform indicating that the potential moves from a reference potential V0 through a potential VL1 lower than the reference potential V0 and a potential VH1 higher than the reference potential V0 and returns to the reference potential V0. In the case where the supply driving signal Vin[m] having the waveform PP1 is supplied to the discharge section D[m], the waveform PP1 is set such that ink corresponding to an ink amount $\xi 1$ is discharged from the discharge section D[m]. The waveform PP2 is a waveform indicating that the potential moves from the reference potential V0 through a potential VL2 lower than the reference potential V0 and a potential VH2 higher than the reference potential V0 and returns to the reference potential V0. In the case where the supply driving signal Vin[m] having the waveform PP2 is supplied to the discharge section D[m], the waveform PP2 is set such that ink corresponding to an ink amount $\xi 2$ is discharged from the discharge section D[m].

In the present embodiment, the ink amount $\xi 1$ is the amount of ink equivalent to that of the medium dot. The ink amount ξ2, which is smaller than the ink amount ξ1, is the amount of ink equivalent to that of the small dot. The sum of the ink amount ξ1 and the ink amount ξ2 is the amount of equivalent to that of the large dot.

In the present embodiment, it is assumed by way of example that when the potential of the supply driving signal Vin[m] supplied to the discharge section D[m] is a high potential, the volume of the cavity 322 in the discharge section D[m] is reduced relative to the low potential case. Therefore, when the discharge section D[m] is driven by the supply driving signal Vin[m] having the waveform PP1 or the waveform PP2, the potential of the supply driving signal Vin[m] changes from a low potential to a high potential, thereby discharging ink in the discharge section D[m] from the nozzle N.

FIG. 8 is a table illustrating the relationship among the individual specification signal Sd[m], the coupling-state specification signal Qc[m], the coupling-state specification signal Qs[m], and the coupling-state specification signal Qf in the printing unit period TPP.

As illustrated in FIG. 8, when the individual specification signal Sd[m] indicates the value of 1, which specifies the discharge section D[m] as the large-dot formation discharge section DP-1 during the unit period TP, the coupling-state specification circuit 310 sets the coupling-state specification signal Qc[m] high over the control period TQ1 and the control period TQ2. In this case, the switch Wc[m] remains on over the unit period TP. Therefore, in the unit period TP, the discharge section D[m] is driven by the supply driving signal Vin[m] having the waveform PP1 and the waveform PP2, thereby discharging an amount of ink equivalent to that of the large dot.

When the individual specification signal Sd[m] indicates the value of 2, which specifies the discharge section D[m] as the medium-dot formation discharge section DP-2 during the unit period TP, the coupling-state specification circuit 310 sets the coupling-state specification signal Qc[m] high during the control period TQ1. In this case, the switch Wc[m] remains on during the control period TQ1. Therefore, in the unit period TP, the discharge section D[m] is driven by the supply driving signal Vin[m] having the waveform PP1, thereby discharging an amount of ink equivalent to that of the medium dot.

When the individual specification signal Sd[m] indicates the value of 3, which specifies the discharge section D[m] as the small-dot formation discharge section DP-3 during the unit period TP, the coupling-state specification circuit 310 sets the coupling-state specification signal Qc[m] high during the control period TQ2. In this case, the switch Wc[m] remains on during the control period TQ2. Therefore, in the unit period TP, the discharge section D[m] is driven by the supply driving signal Vin[m] having the waveform PP2, thereby discharging an amount of ink equivalent to that of the small dot.

When the individual specification signal Sd[m] indicates the value of 4, which specifies the discharge section D[m] as the non-dot formation discharge section DP-4 during the unit period TP, the coupling-state specification circuit 310 sets the coupling-state specification signal Qc[m] low over the unit period TP. In this case, the switch Wc[m] remains off over the unit period TP. Therefore, the supply driving signal Vin[m] is not supplied to the discharge section D[m] in the unit period TP, and no ink is discharged from the discharge section D[m].

Since, in the printing unit period TPP, the individual specification signal Sd[m] specifies the discharge section D[m] as the non-detection target discharge section DP during the unit period TP, the coupling-state specification circuit 310 sets both the coupling-state specification signal Qs[m] and the coupling-state specification signal Qf low over the printing unit period TPP. That is, the switch Ws[m] and the switch Wf remain off over the printing unit period TPP.

Figures 9, 10:
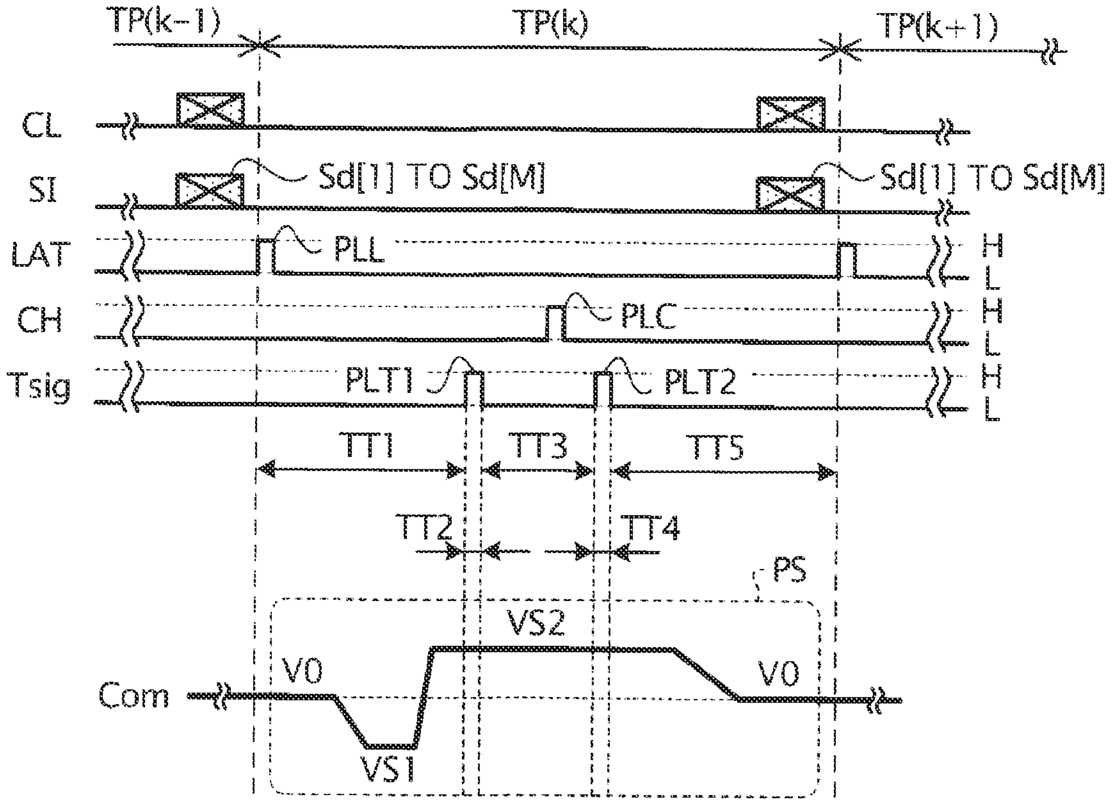
FIG. 9 is a timing chart illustrating an example of operations of the head unit.
FIG. 10 is a table illustrating an example of the individual specification signals.

FIG. 9 is a timing chart in which when the discharge-state determination process or the discharge-state determination preparation process is performed during the unit period TP, an example of various signals supplied to the head unit 3 in the unit period TP is illustrated. The unit period TP during which the discharge-state determination process or the discharge-state determination preparation process is performed may be referred to below as a discharge determination unit period TPS.

As illustrated in FIG. 9, the control unit 2 outputs the period specification signal Tsig having a pulse PLT1 and a pulse PLT2 in the unit period TP. The control unit 2 divides the unit period TP into a control period TT1 from the rise of the pulse PLL to the rise of the pulse PLT1, a control period TT2 from the rise of the pulse PLT1 to the fall of the pulse PLT1, a control period TT3 from the fall of the pulse PLT1 to the rise of the pulse PLT2, a control period TT4 from the rise of the pulse PLT2 to the fall of the pulse PLT2, and a control period TT5 from the fall of the pulse PLT2 to the rise of the pulse PLL.

As illustrated in FIG. 9, in the present embodiment, the driving signal Com has a waveform PS in the discharge determination unit period TPS. The waveform PS is a waveform indicating that the potential varies from the reference potential V0 through a potential VS1 lower than the reference potential V0 to a potential VS2 higher than the reference potential V0 in the control period TT1, remains at a potential VS2 in the control period TT2, the control period TT3, and the control period TT4, and varies from the potential VS2 to the reference potential V0 in the control period TT5. In the present embodiment, it is assumed by way of example that the waveform PS is set not to discharge ink from the discharge section D[m] when the supply driving signal Vin[m] having the waveform PS is supplied to the discharge section D[m].

FIG. 10 is a table illustrating the relationship between the individual specification signal Sd[m] and the coupling-state specification signal Qc[m] in the discharge determination unit period TPS.

In the present embodiment, as illustrated in FIG. 10, it is assumed that, in the discharge determination unit period TPS, the individual specification signal Sd[m] may take any one of two values, that is, a value of 5 that specifies the discharge section D[m] as the determination preparation discharge section DJ, and a value of 6 that specifies the discharge section D[m] as the determination target discharge section DH.

As illustrated in FIG. 10, when the individual specification signal Sd[m] indicates the value of 5, which specifies the discharge section D[m] as the determination preparation discharge section DJ during the unit period TP, the coupling-state specification circuit 310 sets the coupling-state specification signal Qc[m] such that the coupling-state specification signal Qc[m] remains high during the control period TT1 and during the control period TT2 and remains low during the control period TT3, during the control period TT4, and during the control period ITS. In this case, the switch Wc[m] remains on during the control period TT1 and during the control period TT2.

When the individual specification signal Sd[m] indicates the value of 6, which specifies the discharge section D[m] as the determination preparation discharge section DH during the unit period TP, the coupling-state specification circuit 310 sets the coupling-state specification signal Qc[m] such that the coupling-state specification signal Qc[m] remains high during the control period TT1, during the control period TT2, and during the control period TT5 and remains low during the control period TT3 and during the control period TT4. In this case, the switch Wc[m] remains on during the control period TT1, during the control period TT2, and during the control period TT5.

FIG. 11 is a table illustrating the relationship between the individual specification signal Sd[m] and the coupling-state specification signal Qs[m] in the discharge determination unit period TPS.

As illustrated in FIG. 11, when the individual specification signal Sd[m] indicates the value of 5, which specifies the discharge section D[m] as the determination preparation discharge section DJ during the unit period TP, the coupling-state specification circuit 310 sets the coupling-state specification signal Qs[m] such that the coupling-state specification signal Qs[m] remains high during the control period TT2, during the control period TT3, and during the control period TT4 and remains low during the control period TT1 and during the control period ITS. In this case, the switch Ws[m] remains on during the control period TT2, during the control period TT3, and during the control period TT4.

When the individual specification signal Sd[m] indicates the value of 6, which specifies the discharge section D[m] as the determination target discharge section DH during the unit period TP, the coupling-state specification circuit 310 sets the coupling-state specification signal Qs[m] such that the coupling-state specification signal Qs[m] remains high during the control period TT2, during the control period TT3, and during the control period TT4 and remains low during the control period TT1 and during the control period ITS. In this case, the switch Ws[m] remains on during the control period TT2, during the control period TT3, and during the control period TT4.

FIG. 12 is a table illustrating the coupling-state specification signal Qf, the coupling-state specification signal Q1, and the coupling-state specification signal Q2 in the discharge determination unit period TPS.

As illustrated in FIG. 12, in the discharge determination unit period TPS, the coupling-state specification circuit 310 sets the coupling-state specification signal Qf such that the coupling-state specification signal Qf remains high during the control period TT2, during the control period TT3, and during the control period TT4 and remains low during the control period TT1 and during the control period ITS.

In the discharge determination unit period TPS, the coupling-state specification circuit 310 sets the coupling-state specification signal Q1 such that the coupling-state specification signal Q1 remains high during the control period TT1, during the control period TT2, during the control period TT4, and during the control period TT5 and remains low during the control period TT3.

In the discharge determination unit period TPS, the coupling-state specification circuit 310 sets the coupling-state specification signal Q2 such that the coupling-state specification signal Q2 remains high during the control period TT3 and remains low during the control period TT1, during the control period TT2, during the control period TT4, and during the control period ITS.

Figure 13:
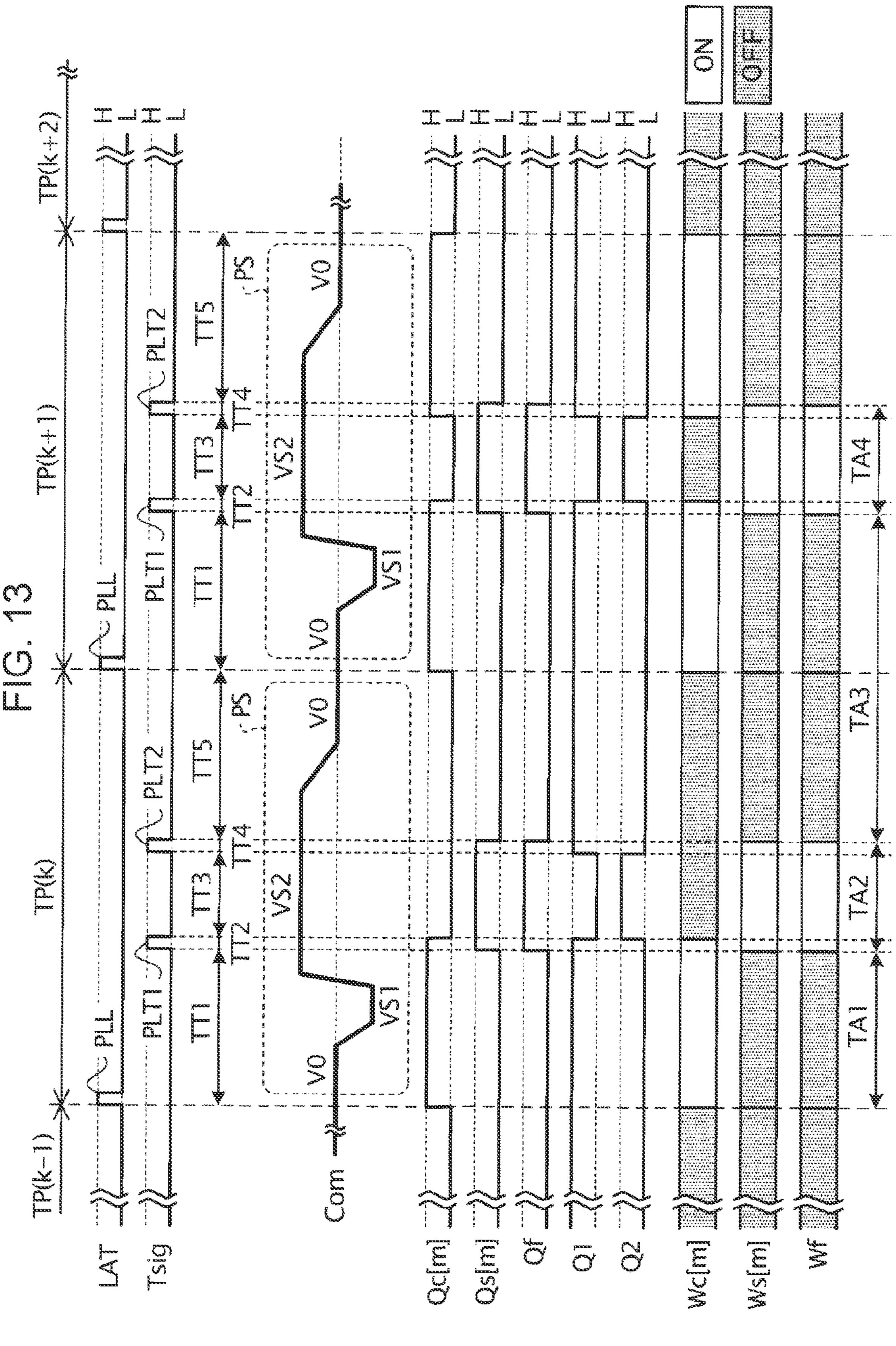
FIG. 13 is a timing chart illustrating an example of operations of the head unit.

FIG. 13 is a timing chart illustrating various signals supplied to the head unit 3 and an example of operations of the head unit 3 when the discharge-state determination preparation process and the discharge-state determination process are performed in the ink jet printer 1. FIGS. 14 to 20 are circuit diagrams illustrating an example of operations of the head unit 3 when the discharge-state determination preparation process and the discharge-state determination process as in FIG. 13 are performed in the ink jet printer 1. An example of operations of the ink jet printer 1 illustrated in FIGS. 13 to 20 may be referred to below simply as a "determination operation example".

In the present embodiment, when a single discharge-state determination process is performed in one unit period TP(k+1) and when a plurality of discharge-state determination processes are performed in a plurality of successive unit periods TP(k+1) to TP(K), the ink jet printer 1 performs the discharge-state determination preparation process in the unit period TP(k) immediately preceding the unit period TP(k+1) during which the single or the plurality of discharge-state determination processes are initially performed. In the determination operation example illustrated in FIGS. 13 to 20, it is assumed that the ink jet printer 1 performs the discharge-state determination preparation process using the discharge section D[m] as the determination preparation discharge section DJ during the unit period TP(k) and performs the discharge-state determination process using the discharge section D[m] as the determination target discharge section DH during the unit period TP(k+1).

In the determination operation example illustrated in FIGS. 13 to 20, it is assumed that the discharge section D[m] selected as the determination preparation discharge section DJ in the unit period TP(k) by the control unit 2 and the discharge section D[m] selected as the determination target discharge section DH in the unit period TP(k+1) by the control unit 2 are the same discharge section D. However, this is an example and the present embodiment is not limited to such. For example, the control unit 2 may select the discharge section D different from the discharge section D selected as the determination preparation discharge section DJ in the unit period TP(k), as the determination target discharge section DH in the unit period TP(k+1).

The determination operation example will be described below.

Figure 14:
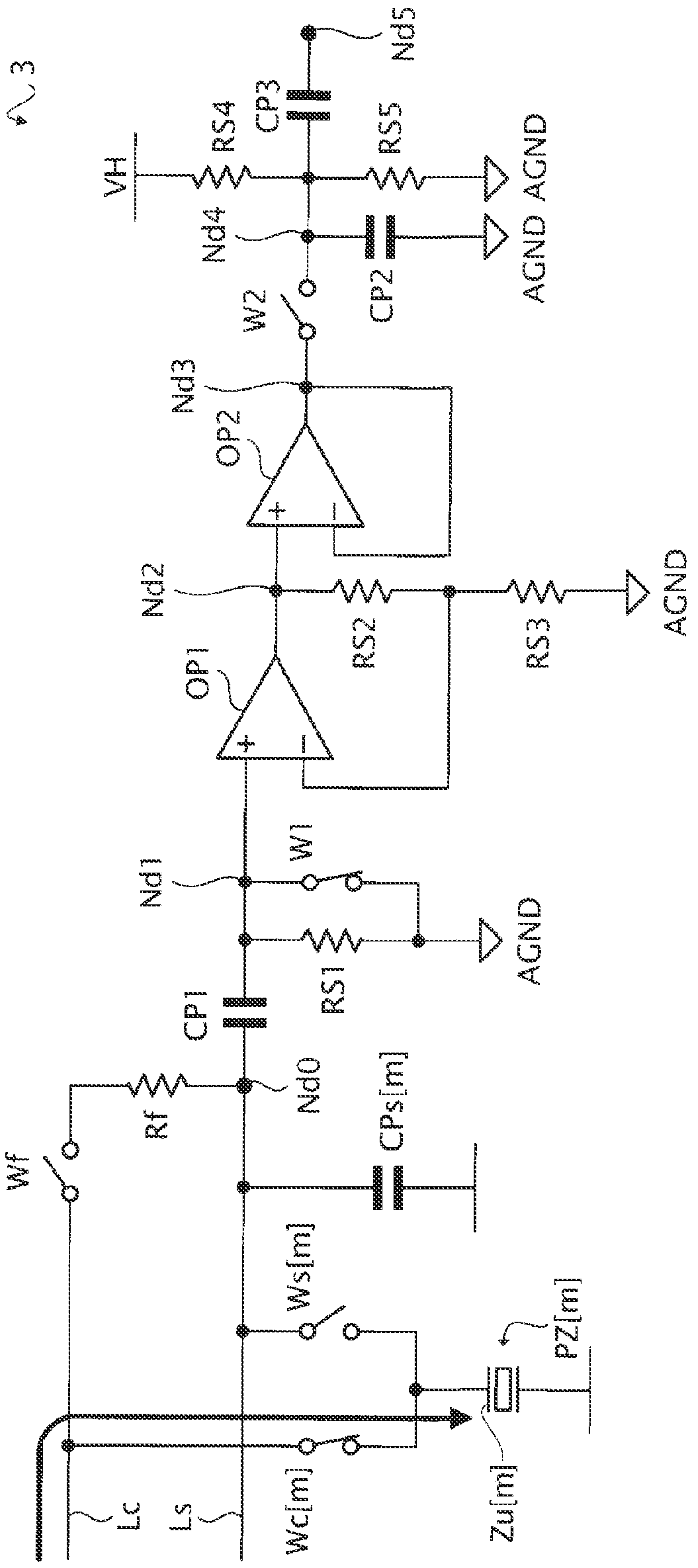
FIG. 14 is an illustrative diagram illustrating an example of operations of the head unit.

FIG. 14 is a diagram illustrating an example of operations of the head unit 3 in the control period TT1 of the unit period TP(k) during which the discharge-state determination preparation process is performed.

As illustrated in FIG. 13, during the control period TT1 of the unit period TP(k), the coupling-state specification signal Qc[m] remains high, the coupling-state specification signal Qs[m] remains low, the coupling-state specification signal Qf remains low, the coupling-state specification signal Q1 remains high, and the coupling-state specification signal Q2 remains low. Therefore, as illustrated in FIGS. 13 and 14, during the control period TT1 of the unit period TP(k), the switch Wc[m] remains on, the switch Ws[m] remains off, the switch Wf remains off, the switch W1 remains on, and the switch W2 remains off. Accordingly, in the control period TT1 of the unit period TP(k), the driving signal Com is supplied from the wire Lc through the switch Wc[m] to the upper electrode Zu[m] included in the piezoelectric element PZ[m]. As a result, the piezoelectric element PZ[m] is driven.

In the control period TT1 of the unit period TP(k), the potential of the node Nd2 is equal to the potential of the analog ground AGND and the potential of the node Nd4 is equal to the potential of the analog ground AGND.

Figure 15:
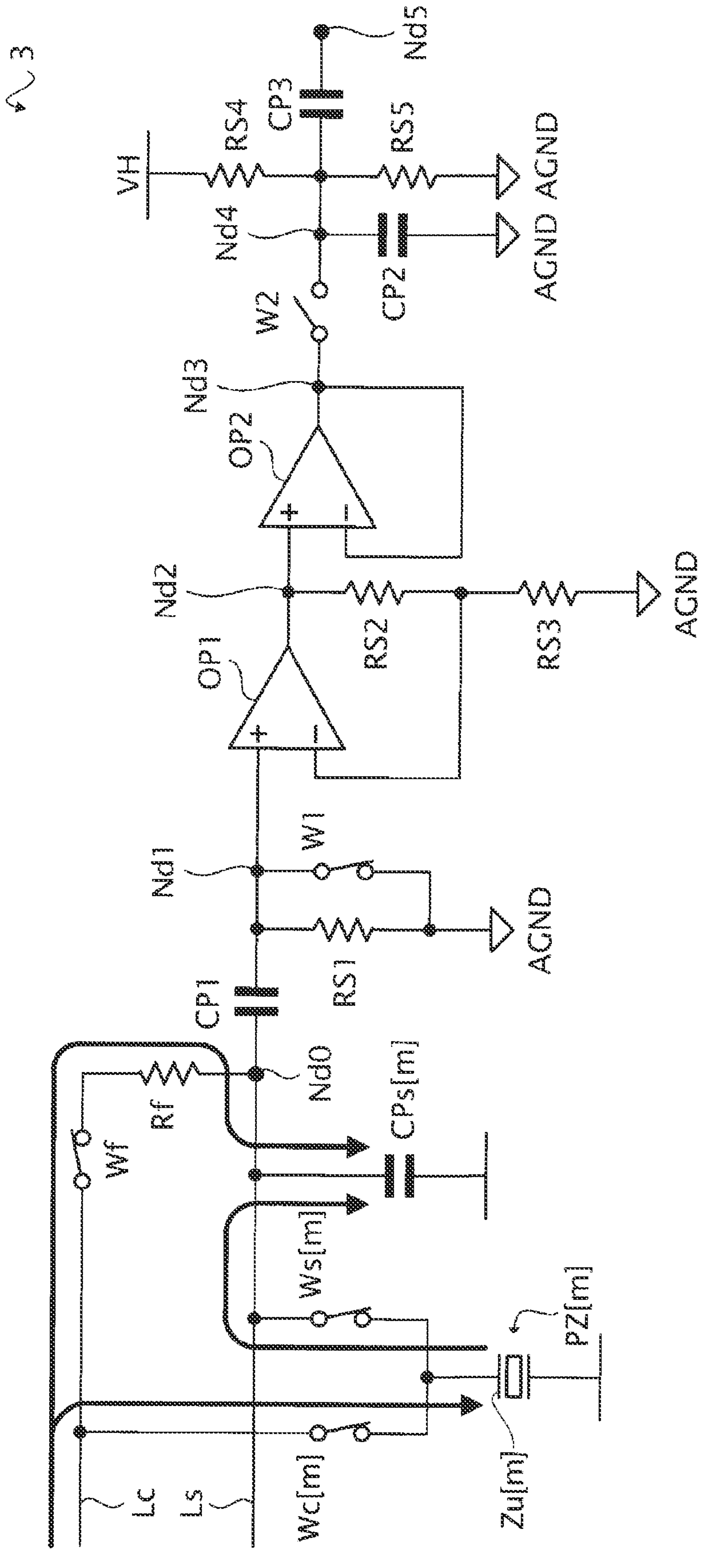
FIG. 15 is an illustrative diagram illustrating an example of operations of the head unit.

FIG. 15 is a diagram illustrating an example of operations of the head unit 3 in the control period TT2 of the unit period TP(k) during which the discharge-state determination preparation process is performed.

As illustrated in FIG. 13, during the control period TT2 of the unit period TP(k), the coupling-state specification signal Qc[m] remains high, the coupling-state specification signal Qs[m] remains high, the coupling-state specification signal Qf remains high, the coupling-state specification signal Q1 remains high, and the coupling-state specification signal Q2 remains low. Therefore, as illustrated in FIGS. 13 and 15, during the control period TT2 of the unit period TP(k), the switch Wc[m] remains on, the switch Ws[m] remains on, the switch Wf remains on, the switch W1 remains on, and the switch W2 remains off. Accordingly, in the control period TT2 of the unit period TP(k), the driving signal Com at the potential VS2 is supplied from the wire Lc through the switch Wc[m] to the upper electrode Zu[m] included in the piezoelectric element PZ[m]. In the control period TT2 of the unit period TP(k), the driving signal Com at the potential VS2 is supplied from the wire Lc through the switch Wc[m] and the switch Ws[m] to the node Nd0 and the driving signal Com at the potential VS2 is supplied from the wire Lc through the switch Wf and the resistor Rf to the node Nd0. As a result, in the control period TT2 of the unit period TP(k), the potential of the node Nd0 is set to the potential VS2.

As illustrated in FIGS. 14 to 20, a capacitor CPs that is a parasitic capacitance of the switch Ws[m] may occur. Specifically, for example, the capacitor CPs, which is a parasitic capacitance, may occur between the gate included in a transistor provided in the switch Ws[m] and the wire Ls. In the present embodiment, in the control period TT2 of the switch TP(k), the capacitor CPs may be charged with a current flowing from the wire Lc through the switch Wc[m] and the switch Ws[m] to the capacitor CPs and a current flowing from the wire Lc through the switch Wf and the resistor Rf to the capacitor CPs.

In the control period TT2 of the unit period TP(k), the potential of the node Nd2 is equal to the potential of the analog ground AGND and the potential of the node Nd4 is equal to the potential of the analog ground AGND.

Figure 16:
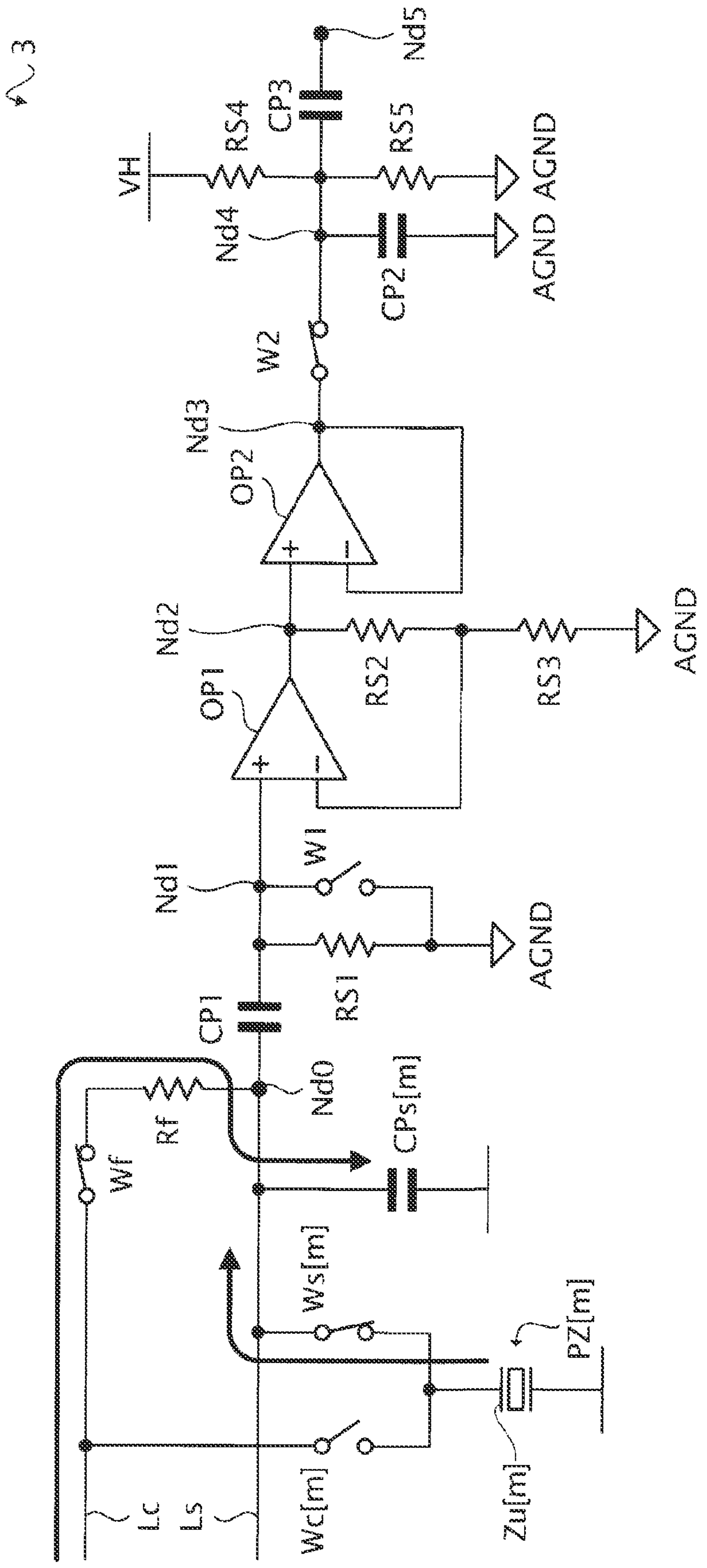
FIG. 16 is an illustrative diagram illustrating an example of operations of the head unit.

FIG. 16 is a diagram illustrating an example of operations of the head unit 3 in the control period TT3 of the unit period TP(k) during which the discharge-state determination preparation process is performed.

As illustrated in FIG. 13, during the control period TT3 of the unit period TP(k), the coupling-state specification signal Qc[m] remains low, the coupling-state specification signal Qs[m] remains high, the coupling-state specification signal Qf remains high, the coupling-state specification signal Q1 remains low, and the coupling-state specification signal Q2 remains high. Therefore, as illustrated in FIGS. 13 and 16, during the control period TT3 of the unit period TP(k), the switch Wc[m] remains off, the switch Ws[m] remains on, the switch Wf remains on, the switch W1 remains off, and the switch W2 remains on. Accordingly, during the control period TT3 of the unit period TP(k), the potential of the node Nd0 is set to a potential based on the potential VS2 of the driving signal Com supplied through the switch Wf and the resistor Rf from the wire Lc and on the potential of the detection potential signal VX[m] supplied through the switch Ws[m] from the upper electrode Zu[m]. During the control period TT3 of the unit period TP(k), the potential of the node Nd2 is at a level determined based on the potential of the detection potential signal VX[m] and the potential of the node Nd4 is at a level determined based on the potential of the detection potential signal VX[m]. In this case, in the control period TT3 of the unit period TP(k), a signal having a waveform in accordance with a potential change in the detection potential signal VX[m] is output from the node Nd5. In the control period TT3 of the unit period TP(k), with a current flowing from the wire Lc through the switch Wc[m] and the switch Ws[m] to the capacitor CPs, the capacitor CPs may also be charged.

Figure 17:
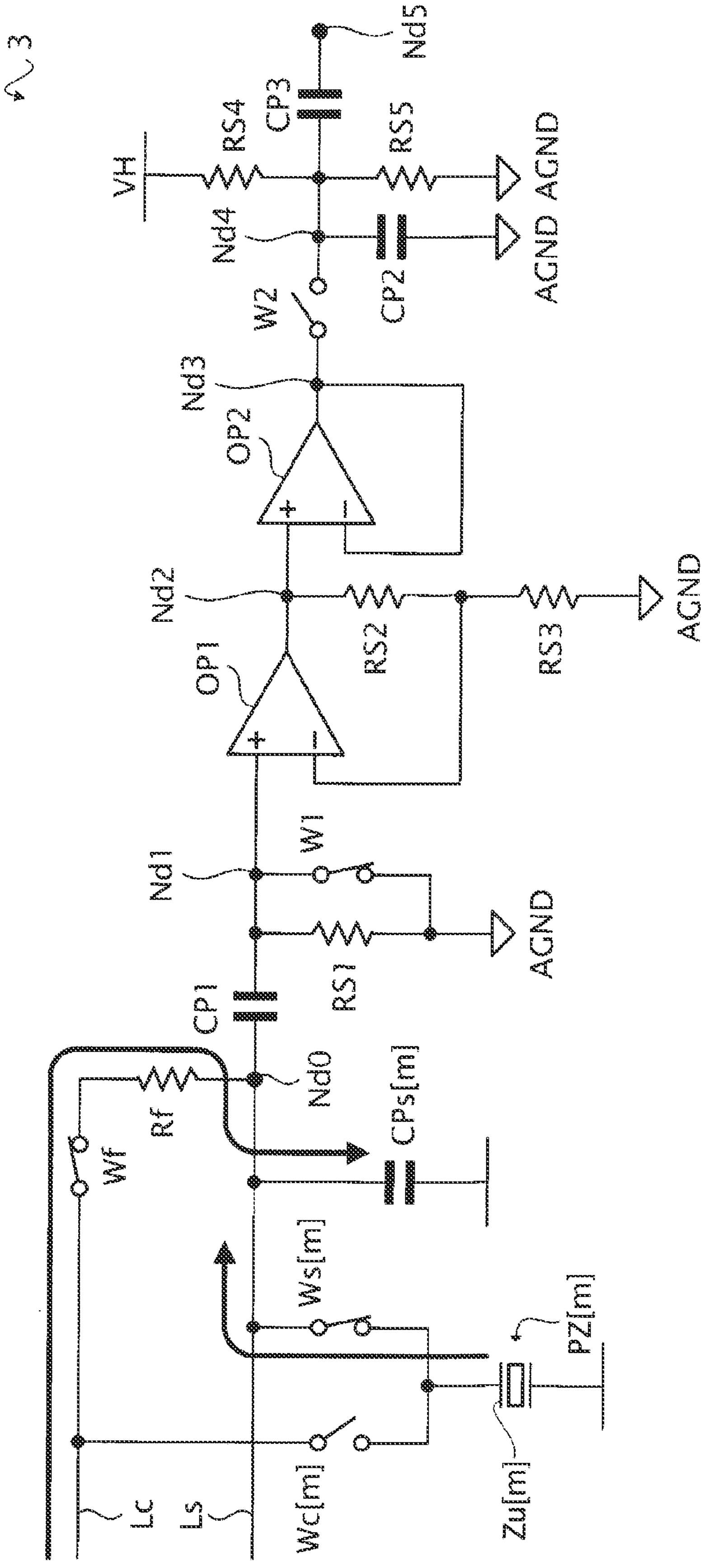
FIG. 17 is an illustrative diagram illustrating an example of operations of the head unit.

FIG. 17 is a diagram illustrating an example of operations of the head unit 3 in the control period TT4 of the unit period TP(k) during which the discharge-state determination preparation process is performed.

As illustrated in FIG. 13, during the control period TT4 of the unit period TP(k), the coupling-state specification signal Qc[m] remains low, the coupling-state specification signal Qs[m] remains high, the coupling-state specification signal Qf remains high, the coupling-state specification signal Q1 remains high, and the coupling-state specification signal Q2 remains low. Therefore, as illustrated in FIGS. 13 and 17, during the control period TT4 of the unit period TP(k), the switch Wc[m] remains off, the switch Ws[m] remains on, the switch Wf remains on, the switch W1 remains on, and the switch W2 remains off. Accordingly, during the control period TT4 of the unit period TP(k), the potential of the node Nd0 is set to a potential based on the potential VS2 of the driving signal Com supplied through the switch Wf and the resistor Rf from the wire Lc and on the potential of the detection potential signal VX[m] supplied through the switch Ws[m] from the upper electrode Zu[m].

In the control period TT4 of the unit period TP(k), the potential of the node Nd2 is determined at a level based on the potential of the detection potential signal VX[m] and the potential of the node Nd4 is equal to the potential of the analog ground AGND.

Figure 18:
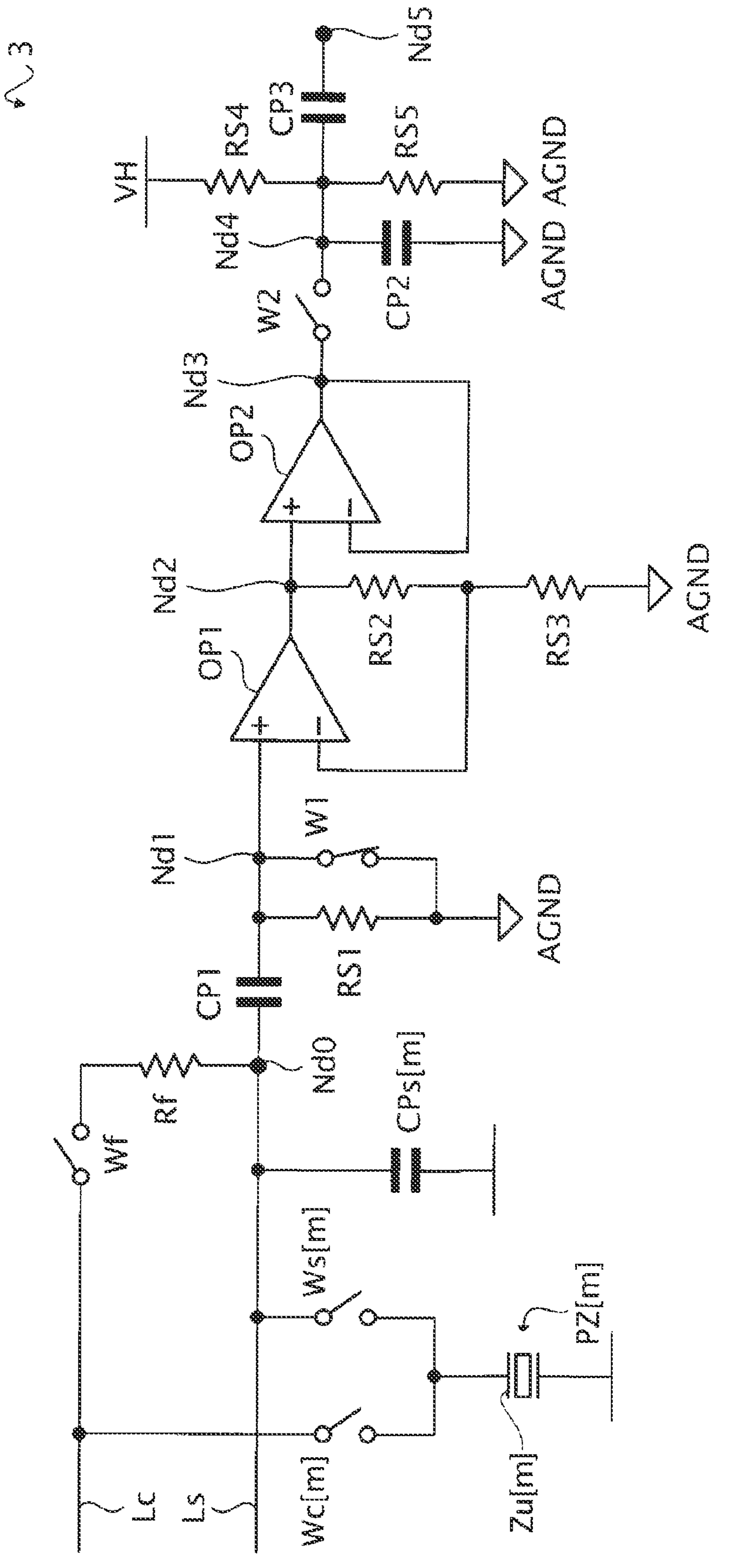
FIG. 18 is an illustrative diagram illustrating an example of operations of the head unit.

FIG. 18 is a diagram illustrating an example of operations of the head unit 3 in the control period TT5 of the unit period TP(k) during which the discharge-state determination preparation process is performed.

As illustrated in FIG. 13, during the control period TT5 of the unit period TP(k), the coupling-state specification signal Qc[m] remains low, the coupling-state specification signal Qs[m] remains low, the coupling-state specification signal Qf remains low, the coupling-state specification signal Q1 remains high, and the coupling-state specification signal Q2 remains low. Therefore, as illustrated in FIGS. 13 and 18, during the control period TT5 of the unit period TP(k), the switch Wc[m] remains off, the switch Ws[m] remains off, the switch Wf remains off, the switch W1 remains on, and the switch W2 remains off. Accordingly, during the control period TT5 of the unit period TP(k), the potential of the node Nd0 remains at the potential VS2.

In the control period TT5 of the unit period TP(k), the potential of the node Nd2 is equal to the potential of the analog ground AGND and the potential of the node Nd4 is equal to the potential of the analog ground AGND.

As illustrated in FIG. 13, in the control period TT1 of the unit period TP(k+1) during which the discharge-state determination process is performed, the head unit 3 operates in the same manner as in the control period TT1 of the unit period TP(k) during which the discharge-state determination preparation process is performed. Therefore, in the control period TT1 of the unit period TP(k+1), the driving signal Com is supplied from the wire Lc through the switch Wc[m] to the upper electrode Zu[m] included in the piezoelectric element PZ[m]. As a result, the piezoelectric element PZ[m] is driven to produce vibrations in the discharge section D[m].

As illustrated in FIG. 13, in the control period TT2 of the unit period TP(k+1) during which the discharge-state determination process is performed, the head unit 3 operates in the same manner as in the control period TT2 of the unit period TP(k). Therefore, in the control period TT2 of the unit period TP(k+1), the driving signal Com at the potential VS2 is supplied from the wire Lc through the switch Wc[m] and the switch Ws[m] to the node Nd0 and the driving signal Com at the potential VS2 is supplied from the wire Lc through the switch Wf and the resistor Rf to the node Nd0.

The vibrations produced in the discharge section D[m] in the control period TT1 of the unit period TP(k+1) remain in the control period TT2 of the unit period TP(k+1). Then, in the control period TT2 of the unit period TP(k+1), the potential of the upper electrode Zu[m] included in the discharge section D[m] changes because of the vibrations remaining in the discharge section D[m]. In the control period TT2 of the unit period TP(k+1), the potential of the upper electrode Zu[m] included in the discharge section D[m] is supplied, through the switch Ws[m], as the detection potential signal VX[m] to the node Nd0.

As illustrated in FIG. 13, in the control period TT3 of the unit period TP(k+1) during which the discharge-state determination process is performed, the head unit 3 operates in the same manner as in the control period TT3 of the unit period TP(k). Therefore, in the control period TT3 of the unit period TP(k+1), the potential of the node Nd0 is set to a potential based on the potential VS2 of the driving signal Com supplied through the switch Wf and the resistor Rf from the wire Lc and on the potential of the detection potential signal VX[m] supplied through the switch Ws[m] from the upper electrode Zu[m]. In this case, the potential of the node Nd2 is at a level determined based on the potential of the detection potential signal VX[m] and the potential of the node Nd4 is at a level determined based on the potential of the detection potential signal VX[m]. Accordingly, in the control period TT3 of the unit period TP(k+1), a signal having a waveform in accordance with the potential change in the detection potential signal VX[m] is output as the detection signal SK[m] from the node Nd5. That is, the waveform of the detection signal SK[m] generated based on the detection potential signal VX[m] detected from the discharge section D[m] in the control period TT3 of the unit period TP(k+1) represents the waveform of vibrations remaining in the discharge section D[m] in the control period TT3 of the unit period TP(k+1).

Figure 19:
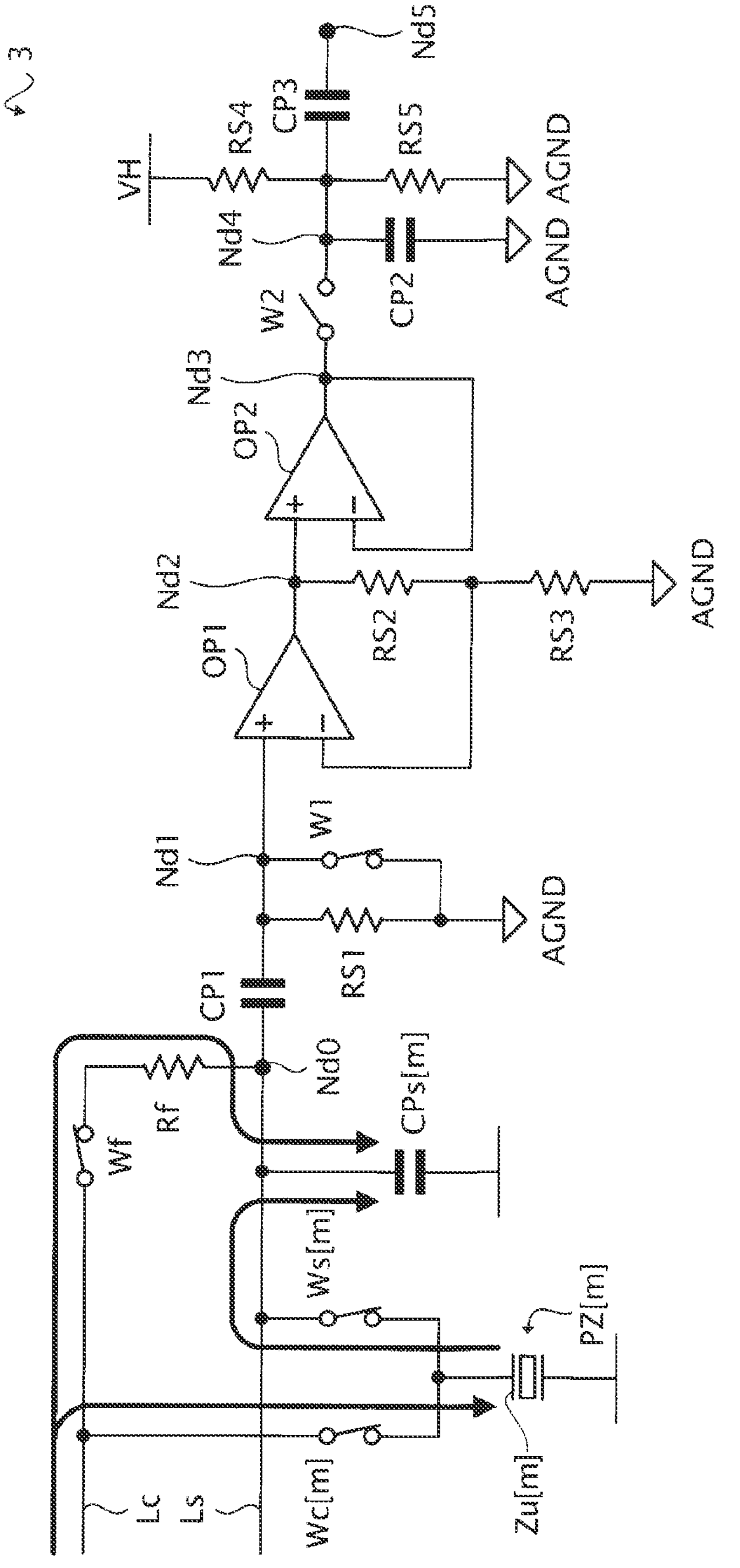
FIG. 19 is an illustrative diagram illustrating an example of operations of the head unit.

FIG. 19 is a diagram illustrating an example of operations of the head unit 3 in the control period TT4 of the unit period TP(k+1) during which the discharge-state determination process is performed.

As illustrated in FIG. 13, during the control period TT4 of the unit period TP(k+1), the coupling-state specification signal Qc[m] remains high, the coupling-state specification signal Qs[m] remains high, the coupling-state specification signal Qf remains high, the coupling-state specification signal Q1 remains high, and the coupling-state specification signal Q2 remains low. Therefore, as illustrated in FIGS. 13 and 19, during the control period TT4 of the unit period TP(k+1), the switch Wc[m] remains on, the switch Ws[m] remains on, the switch Wf remains on, the switch W1 remains on, and the switch W2 remains off. Accordingly, in the control period TT4 of the unit period TP(k+1), the potential of the node Nd0 is set to the potential VS2 of the driving signal Com supplied through the switch Wf and the resistor Rf from the wire Lc.

In the control period TT4 of the unit period TP(k+1), the potential of the node Nd2 is equal to the potential of the analog ground AGND and the potential of the node Nd4 is equal to the potential of the analog ground AGND.

FIG. 20 is a diagram illustrating an example of operations of the head unit 3 in the control period TT5 of the unit period TP(k+1) during which the discharge-state determination process is performed.

As illustrated in FIG. 13, in the control period TT5 of the unit period TP(k+1), the coupling-state specification signal Qc[m] remains high, the coupling-state specification signal Qs[m] remains low, the coupling-state specification signal Qf remains low, the coupling-state specification signal Q1 remains high, and the coupling-state specification signal Q2 remains low. Therefore, as illustrated in FIGS. 13 and 20, during the control period TT5 of the unit period TP(k+1), the switch Wc[m] remains on, the switch Ws[m] remains off, the switch Wf remains off, the switch W1 remains on, and the switch W2 remains off.

As described above, in the present embodiment, during the control period TT2 of the unit period TP(k) during which the discharge-state determination preparation process is performed, the control unit 2 controls the head unit 3 such that the switch Wc[m] remains on and the switch Ws[m] remains on. Therefore, according to the present embodiment, as compared to an aspect in which the switch Wc[m] or the switch Ws[m] remain off during the control period TT2 of the unit period TP(k) during which the discharge-state determination preparation process is performed, the capacitor CPs may be reliably charged in the control period TT2 of the unit period TP(k) during which the discharge-state determination preparation process is performed.

In the determination operation example illustrated in FIGS. 13 and 20, the control period TT1 of the unit period TP(k) during which the discharge-state determination preparation process is performed may be referred to as a period TA1. The control period TT2, the control period TT3, and the control period TT4 of the unit period TP(k) during which the discharge-state determination preparation process is performed may be referred to as a period TA2. The control period TT5 of the unit period TP(k) during which the discharge-state determination preparation process is performed and the control period TT1 of the unit period TP(k+1) during which discharge-state determination process is performed may be referred to as a period TA3. The control period TT2, the control period TT3, and the control period TT4 of the unit period TP(k+1) during which the discharge-state determination process is performed may be referred to as a period TA4.

As illustrated in FIG. 13, in the determination operation example, the switch Ws[m] remains off during the period TA1, remains on during the period TA2, remains off during the period TA3, and remains on during the period TA4. The determination unit 8 determines the state of the piezoelectric element PZ[m] based on the detection signal SK[m] indicating the potential of the node Nd5 in the control period TT3 of the period TA4.

In the present embodiment, the period TA1 is an example of the "first period", the period TA2 is an example of the "second period", the period TA3 is an example of the "third period", and the period TA4 is an example of the "fourth period".

4. Operations of Determination Unit

With reference to FIG. 21, operations of the determination unit 8 will be described below.

Typically, vibrations remaining in the discharge section D[m] have a natural vibration period determined by the shape of the nozzle N included in the discharge section D[m], the weight of ink with which the cavity 322 included in the discharge section D[m] is filled, the viscosity of the ink with which the cavity 322 included in the discharge section D[m] is filled, and other factors. Typically, when a discharge abnormality has occurred because bubbles are contained in the cavity 322 of the discharge section D[m], the period of vibrations remaining in the discharge section D[m] is shorter than when the discharge state is normal. Typically, when a discharge abnormality has occurred because a foreign substance, such as paper dust, is contained in the vicinity of the nozzle N of the discharge section D[m], the period of vibrations remaining in the discharge section D[m] is longer than when the discharge state is normal. Typically, when a discharge abnormality has occurred because the viscosity of ink in the cavity 322 of the discharge section D[m] has increased, the period of vibrations remaining in the discharge section D[m] is longer than when the discharge state is normal. In this way, the period of vibrations remaining in the discharge section D[m] varies in accordance with the discharge state of ink in the discharge section D[m]. Therefore, the discharge state of ink in the discharge section D[m] may be determined based on the period of vibrations remaining in the discharge section D[m].

Typically, when a discharge abnormality has occurred because of a failure in the piezoelectric element PZ[m] of the discharge section D[m], the amplitude of vibrations remaining in the discharge section D[m] is smaller than when the discharge state is normal. Therefore, the discharge state of ink in the discharge section D[m] may be determined based on the amplitude of vibrations remaining in the discharge section D[m].

As described above, the waveform of the detection signal SK[m] represents the waveform of vibrations remaining in the discharge section D[m] driven as the determination target discharge section DH. That is, a period NTC[m] of the waveform of the detection signal SK[m] is the period of vibrations remaining in the discharge section D[m] driven as the determination target discharge section DH. Therefore, the discharge state of ink in the discharge section D[m] driven as the determination target discharge section DH may be determined based on the period NTC[m] of the waveform of the detection signal SK[m]. In addition, an amplitude VM[m] of the waveform of the detection signal SK[m] is an amplitude with a magnitude in accordance with the amplitude of vibrations remaining in the discharge section D[m] driven as the determination target discharge section DH. Therefore, the discharge state of ink in the discharge section D[m] driven as the determination target discharge section DH may be determined based on the amplitude VM[m] of the waveform of the detection signal SK[m].

In the present embodiment, the determination unit 8 identifies the period NTC[m] and the amplitude VM[m] of the waveform of the detection signal SK[m] based on the detection signal SK[m]. In the present embodiment, as illustrated in FIG. 21, the determination unit 8 determines the discharge state of ink in the discharge section D[m] driven as the determination target discharge section DH by comparing the period NTC[m] with one or both of a threshold Tth-L and a threshold Tth-H and comparing the amplitude VM[m] with a threshold Vth, and generates the discharge state determination information JH[m] indicating a result of this determination.

The threshold Tth-L is an estimated value of the boundary between the period NTC[m] of vibrations produced in the discharge section D[m] when the discharge state of the discharge section D[m] is normal and the period NTC[m] of vibrations produced in the discharge section D[m] when bubbles are contained in the cavity 322 of the discharge section D[m]. The threshold Tth-H, which is a value greater than the threshold Tth-L, is an estimated value of the boundary between the period NTC[m] of vibrations produced in the discharge section D[m] when the discharge state of the discharge section D[m] is normal and the period NTC[m] of vibrations produced in the discharge section D[m] when a foreign substance is adhered in the vicinity of the nozzle N of the discharge section D[m] or when the viscosity of ink in the cavity 322 of the discharge section D[m] has increased. The threshold Vth is an estimated value of the boundary between the amplitude VM[m] of vibrations produced in the discharge section D[m] when the discharge state of the discharge section D[m] is normal and the amplitude VM[m] of vibrations produced in the discharge section D[m] when the piezoelectric element PZ[m] of the discharge section D[m] has failed.

As illustrated in FIG. 21, when the amplitude VM[m] satisfies "Vth≤VM[m]" and the period NTC[m] satisfies "Tth-L≤NTC[m]≤Tth-H", the determination unit 8 considers the discharge state of ink in the discharge section D[m] normal and sets a value of 1, which represents that the discharge state of ink in the discharge section D[m] is normal, for the discharge state determination information JH[m]. When the amplitude VM[m] satisfies "Vth≤VM[m]" and the period NTC[m] satisfies "NTC[m]<Tth-L", the determination unit 8 considers that a discharge abnormality has occurred because bubbles are contained in the cavity 322 of the discharge section D[m] and sets a value of 2, which represents that a discharge abnormality due to bubbles has occurred in the discharge section D[m], for the discharge state determination information JH[m]. When the amplitude VM[m] satisfies "Vth≤VM[m]" and the period NTC[m] satisfies "Tth-H<NTC[m]", the determination unit 8 considers that a discharge abnormality has occurred because a foreign substance, such as paper dust, is adhered in the vicinity of the nozzle N of the discharge section D[m] or because the viscosity of ink in the cavity 322 of the discharge section D[m] has increased and sets a value of 3, which represents that a discharge abnormality due to the foreign substance or increased viscosity has occurred in the discharge section D[m], for the discharge state determination information JH[m]. When the amplitude VM[m] satisfies "VM[m]<Vth", the determination unit 8 considers that a discharge abnormality has occurred because the piezoelectric element PZ[m] of the discharge section D[m] has failed and sets a value of 4, which represents that the discharge abnormality due to the failure has occurred in the discharge section D[m], for the discharge state determination information JH[m]. As described above, the determination unit 8 generates the discharge state determination information JH[m] based on the period NTC[m] and the amplitude VM[m] of the waveform of the detection signal SK[m].

5. Reference Example

Figure 22:
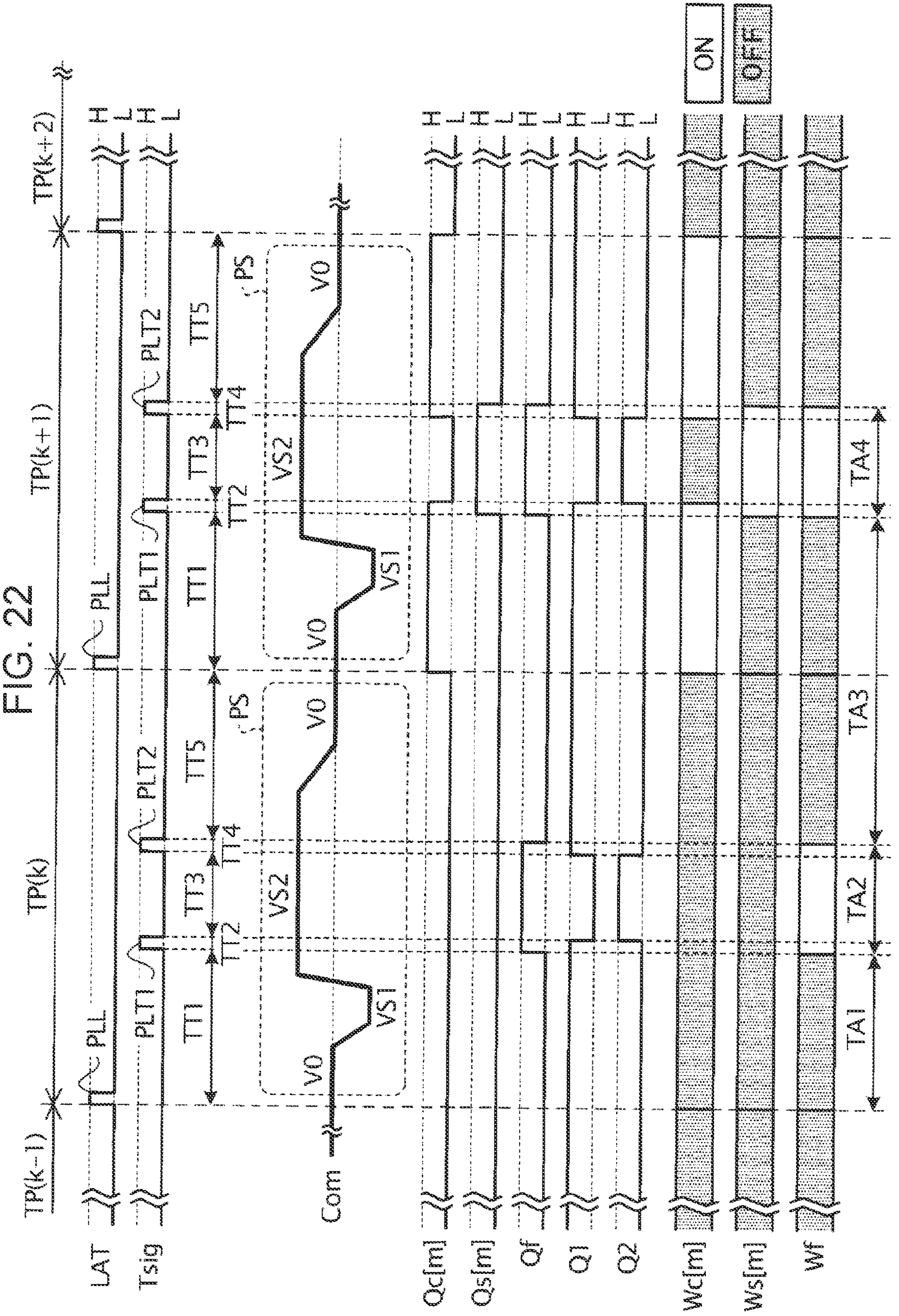
FIG. 22 is a timing chart illustrating an example of operations of the head unit according to a reference example.

With reference to FIG. 22, operations of the head unit 3 according to a reference example will be described below.

FIG. 22 is a timing chart illustrating operations of the head unit 3 according to the reference example.

As illustrated in FIG. 22, the reference example differs from the determination operation example illustrated in FIG. 13 in that, in the reference example, the coupling-state specification signal Qc[m] and the coupling-state specification signal Qs[m] remained low during the unit period TP(k) during which the discharge-state determination preparation process was performed.

In the reference example, in the control period TT2, the control period TT3, and the control period TT4 of the unit period TP(k) during which the discharge-state determination preparation process was performed, the capacitor CPs was charged with a current flowing from the wire Lc through the switch Wf and the resistor Rf to the capacitor CPs.

However, in the reference example, since the resistor Rf was placed in the path from the switch Wf to the capacitor CPs, there were some cases in which charging of the capacitor CPs was not complete in the unit period TP(k) during which the discharge-state determination preparation process was performed. In the reference example, when charging of the capacitor CPs was not complete in the unit period TP(k) during which the discharge-state determination preparation process was performed, in the control period TT2 of the unit period TP(k+1) during which the discharge-state determination process was performed, an inrush current for charging the capacitor CPs was likely to be produced, thereby raising a problem in that noise caused by the inrush current was superimposed on the detection potential signal VX[m] and the detection signal SK[m]. On the other hand, in the reference example, to complete charging of the capacitor CPs, the discharge-state determination preparation process was to be repeated a plurality of times in a plurality of unit periods TP. This was likely to raise a problem in that the start of the discharge-state determination process was delayed. Furthermore, in the reference example, when charging of the capacitor CPs was not complete in the unit period TP(k) during which the discharge-state determination preparation process was performed, at the start of the control period TT3 of the unit period TP(k+1) during which the discharge-state determination process was performed, because the potential of the node Nd0 was a potential different from the potential VS2, an inrush current associated with switching of the switch W2 was likely to be produced, thereby raising a problem in that noise caused by the inrush current was superimposed on the detection potential signal VX[m] and the detection signal SK[m].

In contrast, according to the present embodiment, the capacitor CPs is charged with a current flowing from the wire Lc through the switch Wc[m] and the switch Ws[m] to the capacitor CPs and a current flowing from the wire Lc through the switch Wf and the resistor Rf to the capacitor CPs. Therefore, according to the present embodiment, the capacitor CPs may be charged quickly as compared to the reference example. That is, according to the present embodiment, noise caused by an inrush current for charging the capacitor CPs may be reduced and noise caused by the inrush current associated with switching of the switch W2 may be reduced as compared to the reference example. Therefore, according to the present embodiment, noise superimposed on the detection potential signal VX[m] and the detection signal SK[m] may be reduced as compared to the reference example. Therefore, according to the present embodiment, the discharge state of ink in the discharge section D[m] may be determined more accurately than in the reference example.

6. Conclusion of Embodiment

As described above, the ink jet printer 1 according to the present embodiment includes the piezoelectric element PZ[m] that includes the upper electrode Zu[m] and is driven by the driving signal Com supplied through the wire Lc to the upper electrode Zu[m], the switch Wc[m] that performs switching whether to electrically couple the wire Lc to the upper electrode Zu[m], the detection circuit 33 that detects, via the wire Ls, a vibration produced in the piezoelectric element PZ[m] driven by the driving signal Com, as a potential change in the upper electrode Zu[m], the switch Ws[m] that performs switching whether to electrically couple the wire Ls to the upper electrode Zu[m], and the determination unit 8 that determines the state of the piezoelectric element PZ[m]. The switch Ws[m] remains off during the period TA1, remains on during the period TA2 subsequent to the period TA1, remains off during the period TA3 subsequent to the period TA2, and remains on during the period TA4 subsequent to the period TA3. The determination unit 8 determines the state of the piezoelectric element PZ[m], based on the detection signal SK[m] indicating a detection result of the detection circuit 33 in the control period TT3 of the period TA4.

That is, according to the present embodiment, since the switch Ws[m] is on during the period TA2, the capacitor CPs, which is a parasitic capacitance of the switch Ws[m], may be charged through the switch Ws[m] prior to the period TA4 in which detection is performed by the detection circuit 33. Therefore, according to the present embodiment, in the period TA4 in which detection is performed by the detection circuit 33, occurrence of an inrush current for charging the capacitor CPs may be reduced and the accuracy in detection of a potential change in the upper electrode Zu[m] performed by the detection circuit 33 may be increased.

In the ink jet printer 1 according to the present embodiment, the switch Wc[m] remains on during the control period TT2 of the period TA2.

Therefore, according to the present embodiment, in the period TA2, the capacitor CPs may be charged with the driving signal Com through the wire Lc, the switch Wc[m], and the switch Ws[m].

In the ink jet printer 1 according to the present embodiment, the switch Wc[m] remains on during the control period TT1 of the period TA3.

Therefore, according to the present embodiment, prior to the period TA4, the piezoelectric element PZ[m] may be driven by the driving signal Com.

The ink jet printer 1 according to the present embodiment includes the switch Wf that performs switching whether to electrically couple the wire Lc to the wire Ls, and the resistor Rf electrically coupled between the switch Wf and the wire Ls. The switch Wf remains on during the period TA2 and remains on during the period TA4.

Therefore, according to the present embodiment, the capacitor CPs, which is a parasitic capacitance of the switch Ws[m], may be charged through the switch Wf prior to the period TA4 in which detection is performed by the detection circuit 33.

In the ink jet printer 1 according to the present embodiment, the switch Wf remains off during the period TA1 and remains off during the period TA3.

Therefore, according to the present embodiment, the effect of a potential change in the driving signal Com on the detection circuit 33 may be reduced.

In the ink jet printer 1 according to the present embodiment, the driving signal Com remains at the potential VS2 during the period TA2 and the period TA4.

Therefore, according to the present embodiment, the potential of the wire Ls may be set to the potential VS2 during the period TA2. According to the present embodiment, in the period TA4, the detection circuit 33 may accurately detect a potential change in the upper electrode Zu[m].

B. MODIFICATION EXAMPLES

Each embodiment described above may be modified in a variety of ways. Aspects of specific modifications will be illustrated by way of example below. Two or more aspects selected arbitrarily from the illustrations given below may be combined as appropriate to the extent that they are not inconsistent with each other. In the modification examples illustrated by way of example below, elements with operations and functions similar to those in the embodiment are denoted by reference numerals borrowed from the description given above and detailed description of each of the elements is omitted as appropriate.

First Modification Example

In the embodiment described above, it is assumed that the unit period TP during which the printing process is performed and the unit period TP during which the discharge-state determination process or the discharge-state determination preparation process is performed are different periods. However, the present disclosure is not limited to such.

For example, the discharge-state determination process or the discharge-state determination preparation process may be performed in the unit period TP during which the printing process is performed. In this case, as a wire for transmitting a signal from the driving signal generation unit 4 to the head unit 3, separately from a signal wire for transmitting the driving signal Com having the waveform PP1 and the waveform PP2, a signal wire for transmitting the driving signal Com having the waveform PS may be provided.

Second Modification Example

In the embodiment and the first modification example described above, the case where the ink jet printer 1 is a serial printer is illustrated. However, the present disclosure is not limited to such. The ink jet printer 1 may be a so-called line printer in which, in the head unit 3, a plurality of nozzles N are provided to extend wider than the width of the recording paper P.

Third Modification Example

In the embodiment and the first and second modification examples described above, the ink jet printer 1 including piezoelectric element PZ[m], which is an example of a "capacitive load", is illustrated as a "driving device". However, the present disclosure is not limited to such. The present disclosure is applicable to any "driving device" including the "capacitive load". As the "driving device" according to the present disclosure, for example, audio equipment such as a speaker or an automobile injector may be employed.

What is claimed is:

1. A driving device comprising:

a piezoelectric element including a driving electrode, wherein the piezoelectric element is driven by a driving signal supplied through a first wire to the driving electrode;

a first switch that performs switching whether to electrically couple the first wire to the driving electrode;

a detection circuit that detects, via a second wire, a vibration produced in the piezoelectric element driven by the driving signal, as a potential change in the driving electrode;

a second switch that performs switching whether to electrically couple the second wire to the driving electrode; and a determination circuit that determines a state of the piezoelectric element, wherein the second switch remains off during a first period, remains on during a second period subsequent to the first period, remains off during a third period subsequent to the second period, and remains on during a fourth period subsequent to the third period, the determination circuit determines a state of the piezoelectric element, based on a detection result of the detection circuit in at least part of the fourth period, and the first switch remains off continuously from a timing in the second period to a timing in the third period.

2. The driving device according to claim 1, wherein the first switch remains on during at least part of the second period.

3. The driving device according to claim 1, wherein the first switch remains on during at least part of the third period.

4. The driving device according to claim 1, further comprising:

a third switch that performs switching whether to electrically couple the first wire to the second wire; and a first resistor electrically coupled between the third switch and the second wire, wherein the third switch remains on during the second period, and remains on during the fourth period.

5. The driving device according to claim 4, wherein the third switch remains off during the first period, and remains off during the third period.

6. The driving device according to claim 1, wherein the driving signal remains at a fixed potential.

7. A method for controlling a driving device, the driving device including a piezoelectric element including a driving electrode, wherein the piezoelectric element is driven by a driving signal supplied through a first wire to the driving electrode;

a first switch that performs switching whether to electrically couple the first wire to the driving electrode;

a detection circuit that detects, via a second wire, a vibration produced in the piezoelectric element driven by the driving signal, as a potential change in the driving electrode; and a second switch that performs switching whether to electrically couple the second wire to the driving electrode;

the method comprising:

controlling the second switch to cause the second switch to remain off during a first period, to remain on during a second period subsequent to the first period, to remain off during a third period subsequent to the second period, and to remain on during a fourth period subsequent to the third period;

determining a state of the piezoelectric element, based on a detection result of the detection circuit in at least part of the fourth period; and controlling the first switch to cause the first switch to remain off continuously from a timing in the second period to a timing in the third period.

* * * * *